United States Patent
Tate

(10) Patent No.: US 11,962,575 B2
(45) Date of Patent: Apr. 16, 2024

(54) DATA TRANSMISSION METHOD, COMMUNICATION PROCESSING METHOD, DEVICE, AND COMMUNICATION PROCESSING PROGRAM

(71) Applicant: connectFree Corporation, Kyoto (JP)

(72) Inventor: Kristopher Andrew Tate, Kyoto (JP)

(73) Assignee: connectFree Corporation, Kyoto (JP)

( * ) Notice: Subject to any disclaimer, the term of this patent is extended or adjusted under 35 U.S.C. 154(b) by 288 days.

(21) Appl. No.: 17/426,054

(22) PCT Filed: Jan. 31, 2019

(86) PCT No.: PCT/JP2019/003445
§ 371 (c)(1),
(2) Date: Jul. 27, 2021

(87) PCT Pub. No.: WO2020/157928
PCT Pub. Date: Aug. 6, 2020

(65) Prior Publication Data
US 2022/0116370 A1    Apr. 14, 2022

(51) Int. Cl.
*H04L 29/06* (2006.01)
*H04L 9/06* (2006.01)
(Continued)

(52) U.S. Cl.
CPC ........ *H04L 63/0478* (2013.01); *H04L 9/0643* (2013.01); *H04L 9/0825* (2013.01);
(Continued)

(58) Field of Classification Search
CPC . H04L 63/0478; H04L 9/0463; H04L 9/0825; H04L 9/3263; H04L 9/3268; H04L 63/0471
See application file for complete search history.

(56) References Cited

U.S. PATENT DOCUMENTS 10,958,442 B1 * 3/2021 Maeng .................. H04L 9/3236
2003/0061487 A1 * 3/2003 Angelo ............... G06F 21/6209
                                                                713/176
(Continued)

FOREIGN PATENT DOCUMENTS

JP    H05-022293 A    1/1993
JP    2002529779 A    9/2002
(Continued)

OTHER PUBLICATIONS

Aura, Tuomas. "Cryptographically generated addresses (CGA)." International Conference on Information Security. Berlin, Heidelberg: Springer Berlin Heidelberg, 2003. (Year: 2003).*

(Continued)

*Primary Examiner* — Shawnchoy Rahman
(74) *Attorney, Agent, or Firm* — Merchant & Gould P.C.

(57) ABSTRACT

A data transmission method includes a step in which a first device generates a first encrypted packet by encrypting a packet addressed to a second device with an associated first encryption key. A device to be a transmission destination of the first encrypted packet is determined. A second encrypted packet is generated by encrypting the first encrypted packet with an associated second encryption key, and the second encrypted packet is transmitted to the determined device. The method includes determining another device and executing the transmission step if the decrypted first encrypted packet is not addressed to the device itself in the determination regarding whether or not the decrypted first encrypted packet is addressed to the device itself and of further decrypting the first encrypted packet if the decrypted first encrypted packet is addressed to the device itself.

9 Claims, 14 Drawing Sheets

(51) Int. Cl.
  *H04L 9/08* (2006.01)
  *H04L 9/32* (2006.01)
  *H04L 9/40* (2022.01)
  *H04L 45/74* (2022.01)
  *H04L 67/141* (2022.01)

(52) U.S. Cl.
  CPC .......... *H04L 9/3263* (2013.01); *H04L 9/3268* (2013.01); *H04L 45/74* (2013.01); *H04L 63/0471* (2013.01); *H04L 67/141* (2013.01)

(56) References Cited

U.S. PATENT DOCUMENTS

| | | | |
|---|---|---|---|
| 2005/0041675 | A1 | 2/2005 | Trostle et al. |
| 2007/0061574 | A1 | 3/2007 | Shelest et al. |
| 2010/0161966 | A1* | 6/2010 | Kwon .................. H04L 9/3273 380/278 |
| 2012/0110326 | A1 | 5/2012 | Rossi |
| 2017/0055148 | A1 | 2/2017 | Zimmerman et al. |
| 2018/0270059 | A1 | 9/2018 | Nix |
| 2018/0295613 | A1 | 10/2018 | Dunne et al. |
| 2021/0160352 | A1 | 5/2021 | Tate |

FOREIGN PATENT DOCUMENTS

| | | |
|---|---|---|
| JP | 2013-5110 A | 1/2013 |
| JP | 2018-207472 A | 12/2018 |
| WO | 200027090 A1 | 5/2000 |

OTHER PUBLICATIONS

Supplementary EP Search Report received in corresponding application dated Aug. 12, 2022, 7 pages.

Y. Ishida et al., "Implementation of IPV6 Security Function", NEC Technical Journal 52(6): 54-55 (1999), with English Abstract.

International Search Report for PCT/JP2019/003445 (dated Apr. 2, 2019).

Office Action for Taiwanese Patent Application No. 109102812 (dated Apr. 12, 2023).

Office Action for Indian Patent Application No. 202117039221 (dated Mar. 17, 2023).

Japanese Office Action received for JP Application No. 2023-006080 on Feb. 28, 2024, 4 pages.

* cited by examiner

FIG.5

| VALUE (HEXADECIMAL NOTATION) | DEVICE TYPE |
|---|---|
| 00 | PERSONAL COMPUTER (PC) |
| 01 | SMARTPHONE, TABLET, WEARABLE DEVICE |
| 02 | INFORMATION APPLIANCES |
| 03 | VEHICLE |
| 04 | INSTRUMENT |

DATA TRANSMISSION METHOD, COMMUNICATION PROCESSING METHOD, DEVICE, AND COMMUNICATION PROCESSING PROGRAM

This application is a National Stage of PCT/JP2019/003445, filed Jan. 31, 2019, which application is incorporated herein by reference. To the extent appropriate, a claim of priority is made to the above-disclosed application.

TECHNICAL FIELD

The present disclosure relates to data communication technology between devices having authenticated IP addresses.

BACKGROUND ART

The development of information and communication technology (ICT) has been remarkable in recent years, and devices connected to a network such as the Internet are not limited to conventional information processing devices, such as personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

Usually, on a network, data communication between devices is realized by using an IP (Internet Protocol) address statically or dynamically assigned to each device.

In order to realize data communication between devices, data transmitted from the transmission source device should be transmitted to the destination device. Such data transmission processing is referred to as "routing" or the like. In order to realize such routing, a large number of routers are arranged on the network.

As disclosed in JP H05-022293 A (Patent Document 1), a router has a route information table for storing route information, and determines a route and relays a received frame according to the internetworking address in the received frame and the content of the route information table (see paragraphs [0005] and [0006] in JP H05-022293 A).

CITATION LIST

Patent Document

Patent Document 1: JP H05-022293 A

SUMMARY OF THE INVENTION

Problem to be Solved by the Invention

According to the above Patent Document 1, assuming that there is a network in which a large number of devices are present, there is a problem that a large number of routers are required and the responsibility of each router is large. For this reason, in a network in which a large number of devices are present, it is preferable that each device can independently realize data communication. The present disclosure provides a solution, such as a data transmission method in which each device independently realizes data communication in a network in which a large number of devices are present.

Means for Solving Problem

According to an aspect of the present disclosure, a data transmission method in a network to which a plurality of devices are connected is provided. The transmission method includes: a step in which a first device generates a first encrypted packet by encrypting a packet addressed to a second device with a first encryption key associated with the second device; a step of determining a device to be a transmission destination of the first encrypted packet, generating a second encrypted packet by encrypting the first encrypted packet with a second encryption key associated with the determined device, and transmitting the second encrypted packet to the determined device; a step in which a device that receives the second encrypted packet decrypts the second encrypted packet into the first encrypted packet and determines whether or not the decrypted first encrypted packet is addressed to the device itself; and a step of determining another device and executing the transmission step if the decrypted first encrypted packet is not addressed to the device itself in the determination regarding whether or not the decrypted first encrypted packet is addressed to the device itself and of further decrypting the first encrypted packet if the decrypted first encrypted packet is addressed to the device itself.

The data transmission method described above may further include: a step in which each of the plurality of devices transmits a public key of each device and a digital certificate associated with the public key to another device; and a step in which the device that receives the public key and the digital certificate determines an IP address of a transmission source device of the public key and the digital certificate based on a hash value calculated from the public key according to a hash function.

According to another aspect of the present disclosure, a communication processing method in a device connected to a network is provided. The communication processing method includes: as steps executed when a packet addressed to another device is given, a step of generating a first encrypted packet by encrypting the packet with a first encryption key associated with the another device; a step of determining a device to be a transmission destination of the first encrypted packet; a step of generating a second encrypted packet by encrypting the first encrypted packet with a second encryption key associated with the determined device; and a step of transmitting the second encrypted packet to the determined device. The communication processing method further includes: as steps executed when the second encrypted packet is received from another device, a step of decrypting the second encrypted packet into the first encrypted packet; a step of determining whether or not the decrypted first encrypted packet is addressed to the device itself; a step of determining still another device to be a transmission destination of the first encrypted packet, generating a second encrypted packet with a second encryption key associated with the determined device, and transmitting the generated second encrypted packet if the decrypted first encrypted packet is not addressed to the device itself; and a step of further decrypting the first encrypted packet if the decrypted first encrypted packet is addressed to the device itself.

In the aspect described above, a device to be a transmission destination may be determined based on an IP address of each device.

The communication processing method described above may further include: a step of acquiring a private key and a public key; a step of determining an IP address of the device itself based on a hash value calculated from the public key according to a hash function; a step of acquiring a digital certificate associated with the public key from a certificate authority; and a step of transmitting the public key and the digital certificate to another device.

The communication processing method described above may further include: a step in which, when the public key and a digital certificate associated with the public key are received from the another device, validity of the digital certificate is determined; and a step in which, when it is determined that the digital certificate is valid, an IP address of the another device is determined based on a hash value calculated from the public key according to a hash function.

The communication processing method described above may further include, as a step executed when a packet addressed to the another device is given, a step of searching for an IP address of the destination device.

The communication processing method described above may further include, as a step executed when a packet addressed to the another device is given, a step of establishing a session between the device itself and the another device and determining the first encryption key. In addition, the communication processing method described above may further include, as a step executed when the second encrypted packet is received from the another device, a step of establishing a session between the device itself and still another device to be a transmission destination of the first encrypted packet and determining the second encryption key.

According to still another aspect of the present disclosure, a device including a network interface for connecting to a network and a control unit connected to the network interface is provided. The control unit includes: a first encryption/decryption unit capable of executing a process for encrypting a packet into a first encrypted packet using a first encryption key associated with another device and a process for decrypting the first encrypted packet; a second encryption/decryption unit capable of executing a process for encrypting the first encrypted packet into a second encrypted packet using a second encryption key associated with a device to be a transmission destination of the first encrypted packet and a process for decrypting the second encrypted packet; and a transmission management unit that transmits the second encrypted packet, which is generated by encrypting a packet addressed to another device in the first encryption/decryption unit and the second encryption/decryption unit, to a device as a transmission destination. The transmission management unit determines whether or not a first encrypted packet generated by decrypting a second encrypted packet received from another device in the second encryption/decryption unit is addressed to the device itself, transmits a second encrypted packet generated by encrypting the first encrypted packet in the second encryption/decryption unit to still another device if the generated first encrypted packet is not addressed to the device itself, and further decrypts the first encrypted packet in the first encryption/decryption unit and outputs the decrypted first encrypted packet if the generated first encrypted packet is addressed to the device itself.

According to still another aspect of the present disclosure, a communication processing program for a computer having a network interface for connecting to a network is provided. When the communication processing program is executed by the computer, the communication processing program causes the computer to execute any of the communication processing methods described above.

Effect of the Invention

According to the present disclosure, it is possible to provide a solution in which each device can independently realize data communication in a network in which a large number of devices are present.

BRIEF DESCRIPTION OF DRAWINGS

FIG. 5 is a diagram showing an example of type identification information embedded in the IP address used in the network system according to the present embodiment;

MODE(S) FOR CARRYING OUT THE INVENTION

Figure 1:
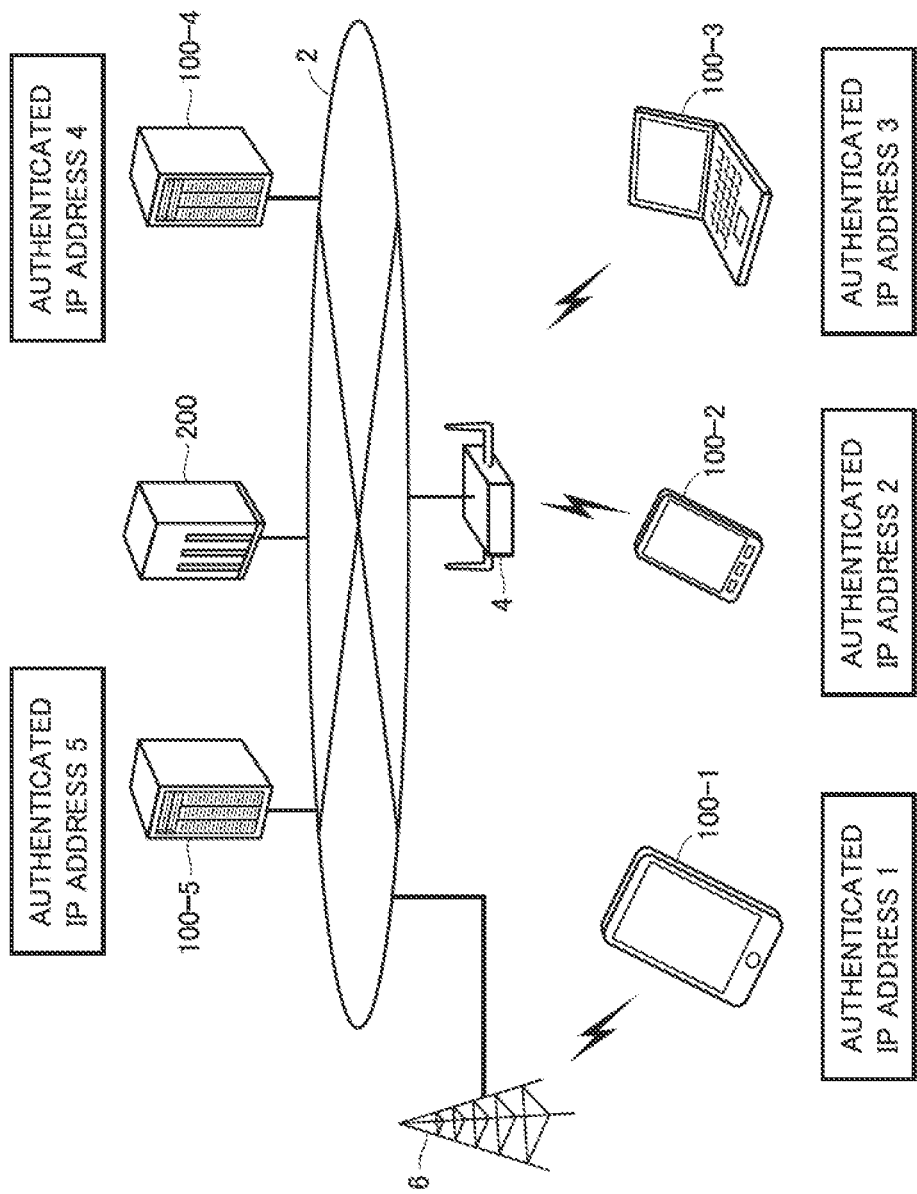
FIG. 1 is a schematic diagram showing an example of the overall configuration of a network system according to the present embodiment.

Hereinafter, an embodiment according to the present disclosure will be described in detail with reference to the diagrams. In addition, the same or corresponding portions in the diagrams are denoted by the same reference numerals, and the description thereof will not be repeated.

<A. Overall Configuration of Network System 1>

First, the overall configuration of the network system 1 according to the present embodiment will be described.

FIG. 1 is a schematic diagram showing an example of the overall configuration of the network system 1 according to the present embodiment. Referring to FIG. 1, it is assumed that a plurality of devices 100-1, 100-2, and 100-3, 100-4, 100-5, . . . (hereinafter, may be referred to collectively as a "device 100") are connected to an arbitrary network 2 such as the Internet or an intranet. Some of the devices 100 may be connected to the network 2 through wireless communication established between the devices 100 and an access point 4. Alternatively, some other devices 100 may be connected to the network 2 through wireless communication established between the devices 100 and a mobile base station 6.

Thus, the network 2 may include any one of a local area network (LAN), a wide area network (WAN), a radio access network (RAN), and the Internet.

Each of the devices 100 connected to the network can be regarded as a "node" of the network, and in the following description, the device 100 may be referred to as a "node".

In the network system 1 according to the present embodiment, data communication is realized between the devices 100 according to a procedure described later. In addition, any physical connection method between the devices 100 may be used.

The device 100 includes any device having a function of performing data communication with other devices using the IP address of each device. The device 100 may be configured as a single communication device, may be configured as a part of any thing, or may be configured to be embedded in any thing.

More specifically, the device 100 may be, for example, a personal computer, a smartphone, a tablet, or a wearable device (for example, a smart watch or an AR glass) worn on the user's body (for example, an arm or a head). In addition, the device 100 may be a control device installed in a smart home appliance, a connected automobile, a factory, and the like or a part thereof.

The network system 1 according to the present embodiment further includes one or more certificate authorities 200. Each of the certificate authorities 200 is a computer configured by one or more servers. The IP address of each device 100 is authenticated according to a procedure, which will be described later, by using one or more certificate authorities 200. As a result, each device 100 has an authenticated IP address.

In this specification, the "authenticated IP address" means a state in which the validity of the IP address held by each device 100 is guaranteed for the communication destination or a third party. More specifically, the "authenticated IP address" means an IP address that is generated by an irreversible cryptographic hash function and is directly or indirectly authenticated by the certificate authority (details thereof will be described later). By using such an "authenticated IP address", it can be guaranteed that the IP address used by each device 100 for data communication is not spoofed.

As a result, any device 100 included in the network system 1 is uniquely identified based on the IP address of each device 100. That is, each device can determine a device to be a destination or a transmission destination of data transmission based on the IP address of each device.

The IP address is assumed to be a global IP address that can also be used for data communication between the devices 100 connected to the Internet, but may be a private IP address that is used only in a specific network.

The number of bits that make up an IP address differs depending on the version. In the currently established IPv4 (Internet Protocol Version 4), a 32-bit address section is defined, and in the currently established IPv6 (Internet Protocol Version 6), a 128-bit address section is defined. In the present embodiment, an IP address according to IPv6 will be mainly described. However, the present disclosure can also be applied to a network address specified by a larger number of bits or a network address specified by a smaller number of bits.

<B. Configuration Example of Device 100>

Next, a configuration example of the hardware and software of the device 100 used in the network system 1 according to the present embodiment will be described.

Figure 2:
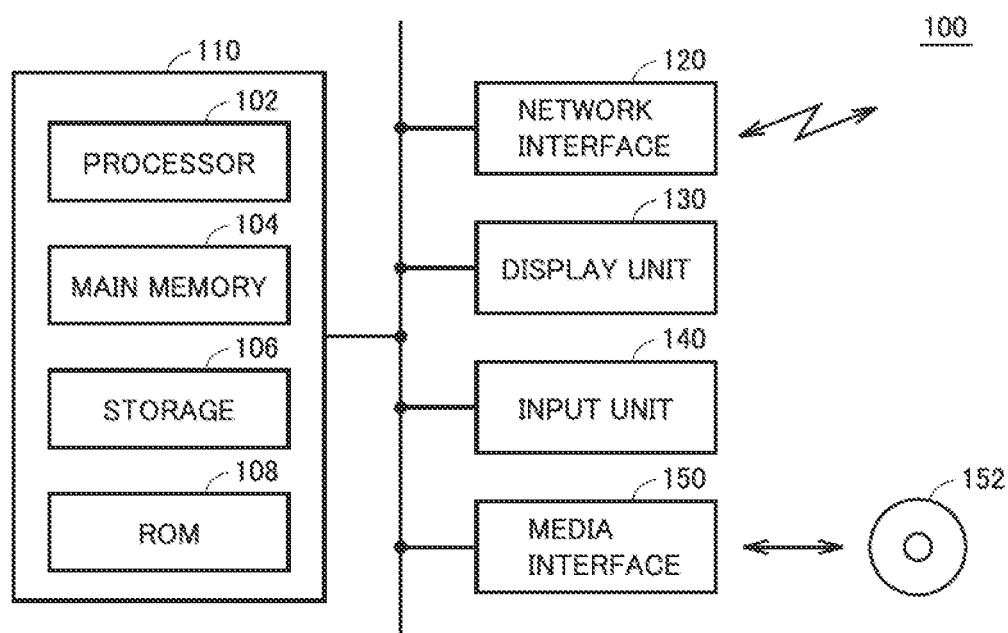
FIG. 2 is a schematic diagram showing a hardware configuration example of a device according to the present embodiment.

FIG. 2 is a schematic diagram showing a hardware configuration example of the device 100 according to the present embodiment. Referring to FIG. 2, the device 100 includes a control unit 110, which is a processing circuitry, as a main component.

The control unit 110 is a calculation subject for providing functions and executing processes according to the present embodiment. The control unit 110 may be configured such that, by using a processor and a memory shown in FIG. 2, the processor executes computer-readable instructions (an OS (Operating System) and a communication processing program shown in FIG. 3) stored in the memory. Alternatively, the control unit 110 may be realized by using a hard-wired circuit such as an ASIC (Application Specific Integrated Circuit) in which a circuit corresponding to computer-readable instructions is provided. In addition, the control unit 110 may be realized by realizing a circuit corresponding to computer-readable instructions on an FPGA (field-programmable gate array). In addition, the control unit 110 may be realized by appropriately combining a processor, a memory, an ASIC, an FPGA, and the like.

In a configuration using the processor and the memory shown in FIG. 2, the control unit 110 includes a processor 102, a main memory 104, a storage 106, and a ROM (Read Only Memory) 108.

The processor 102 is an arithmetic circuit that sequentially reads and executes computer-readable instructions. The processor 102 includes, for example, a CPU (Central Processing Unit), an MPU (Micro Processing Unit), and a GPU (Graphics Processing Unit). The control unit 110 may be realized by using a plurality of processors 102 (multi-processor configuration), or the control unit 110 may be realized by using a processor having a plurality of cores (multicore configuration).

The main memory 104 is a volatile storage device, such as a DRAM (Dynamic Random Access Memory) or a SRAM (Static Random Access Memory). The processor 102 loads a designated program, among various programs stored in the storage 106 or the ROM 108, into the main memory 104 and cooperates with the main memory 104 to realize various processes according to the present embodiment.

The storage 106 is, for example, a non-volatile storage device, such as an HDD (Hard Disk Drive), an SSD (Solid State Drive), or a flash memory. The storage 106 stores various programs executed by the processor 102 or various kinds of data described later.

The ROM 108 fixedly stores various programs executed by the processor 102 or various kinds of data described later.

In the configuration shown in FIG. 2 in which the processor 102 executes computer-readable instructions stored in the memory, the memory corresponds to the storage 106 and the ROM 108.

Here, an example of a program and data stored in the memory of the device 100 will be described.

Figure 3:
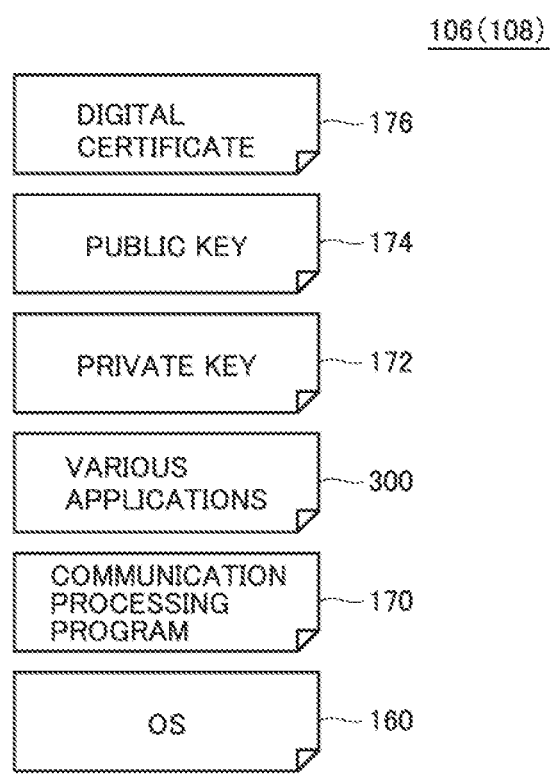
FIG. 3 is a schematic diagram showing a configuration example of a program and data of a device according to the present embodiment.

FIG. 3 is a schematic diagram showing a configuration example of a program and data of the device 100 according to the present embodiment. Referring to FIG. 3, in the memory (the storage 106 and/or the ROM 108) of the device 100, for example, an OS 160, a communication processing program 170, and various applications 300 are stored as programs including computer-readable instructions.

The OS 160 is a program that provides basic functions for realizing the processing executed by the device 100. The communication processing program 170 is mainly a program for providing the functions and executing the processes according to the present embodiment. In addition, the communication processing program 170 may provide the functions and execute the processes according to the present embodiment by using a library or the like provided by the OS 160.

The various applications 300 are programs for realizing various functions provided by the device 100, and can be arbitrarily installed by the user. Typically, the various applications 300 provide various processes using a data communication function provided by the communication processing program 170.

In addition, in the memory (the storage 106 and/or the ROM 108) of the device 100, for example, a private key 172, a public key 174, and a digital certificate 176 are stored as data necessary for providing the functions and executing the processes according to the present embodiment. The private key 172 and the public key 174 are a so-called key pair generated according to an arbitrary encryption/decryption algorithm. The private key 172 is used for encrypted communication with other devices. The public key 174 is used to determine the IP address of each device 100 according to a procedure described later. The digital certificate 176 is issued to the public key 174 by the certificate authority 200, and is for ensuring the validity of the IP address of the device 100. Usually, the digital certificate 176 includes a hash value (digital signature) calculated from the public key 174 of each device 100 using the private key of the certificate authority 200. The device 100 that has received the digital certificate 176 checks the validity of the digital certificate 176 and the public key 174 associated with the digital certificate 176 by using the public key of the certificate authority 200.

The generation of a key pair (the private key 172 and the public key 174), the acquisition of the digital certificate 176, the procedure for using these pieces of data, and the like will be described later.

In addition, it is not necessary to provide both the storage 106 and the ROM 108, and only one of the storage 106 and the ROM 108 may be provided depending on the mounting type. In addition, when both the storage 106 and the ROM 108 are provided, for example, the key pair (the private key 172 and the public key 174) may be stored in the ROM 108 to enhance the confidentiality.

Referring back to FIG. 2, the device 100 further includes a network interface 120 for connecting the device 100 to the network. The network interface 120 performs data communication with other devices through the network.

Examples of the network interface 120 include wired connection terminals, such as serial ports including an Ethernet (registered trademark) port, a USB (Universal Serial Bus) port, and an IEEE1394 and a legacy parallel port. Alternatively, the network interface 120 may include processing circuitries and antennas for wireless communication with devices, routers, mobile base stations, and the like. The wireless communication supported by the network interface 120 may be any of Wi-Fi (registered trademark), Bluetooth (registered trademark), ZigBee (registered trademark), LPWA (Low Power Wide Area), GSM (registered trademark), W-CDMA, CDMA200, LTE (Long Term Evolution), and 5th generation mobile communication system (5G), for example.

The device 100 may include a display unit 130, an input unit 140, and a media interface 150 as optional components.

The display unit 130 is a component for presenting the processing result of the processor 102 to the outside. The display unit 130 may be, for example, an LCD (Liquid Crystal Display) or an organic EL (Electro-Luminescence) display. In addition, the display unit 130 may be a head-mounted display mounted on the user's head, or may be a projector that projects an image on the screen.

The input unit 140 is a component for receiving an input operation of a user who operates the device 100. The input unit 140 may be, for example, a keyboard, a mouse, a touch panel arranged on the display unit 130, or an operation button arranged in the housing of the device 100.

The media interface 150 reads various programs and/or various kinds of data from a non-transitory media 152 in which various programs (computer-readable instructions) and/or various kinds of data are stored.

The media 152 may be, for example, an optical medium, such as a DVD (Digital Versatile Disc), or a semiconductor medium, such as a USB memory. The media interface 150 adopts a configuration according to the type of the media 152. Various programs and/or various kinds of data read by the media interface 150 may be stored in the storage 106 or the like.

In addition, instead of installing various programs and/or various kinds of data on the device 100 through the media 152, necessary programs and data may be installed on the device 100 from a distribution server on the network. In this case, the necessary programs and data are acquired through the network interface 120.

As described above, since the display unit 130, the input unit 140, and the media interface 150 are optional components, the display unit 130, the input unit 140, and the media interface 150 may be connected from the outside of the device 100 through any interface such as a USB.

Providing the functions and executing the processes according to the present embodiment are realized by the control unit 110, and the technical scope of this application includes at least the hardware and/or the software for realizing the control unit 110. As described above, for the hardware, not only a configuration including a processor and a memory but also a configuration using a hard-wired circuit using an ASIC or the like or a configuration using an FPGA can be included. That is, the control unit 110 can be realized by installing a program on a general-purpose computer, or can be realized as a dedicated chip.

In addition, the software executed by the processor may include not only software distributed through the media 152 but also software appropriately downloaded through a distribution server.

In addition, the configuration for providing the functions and executing the processes according to the present embodiment is not limited to the control unit 110 shown in FIG. 2, and can be implemented by using any technology according to the time of the implementation.

<C. Authenticated IP Address>

Next, a process for providing an authenticated IP address to each device 100 and the like will be described.

(c1: IP Address Determination Process)

In the network system 1 according to the present embodiment, typically, the IP address of each device 100 is authenticated by using an authenticated IP address. As an example, the IP address of each device 100 may be authenticated by using a public key infrastructure (PKI).

Figure 4:
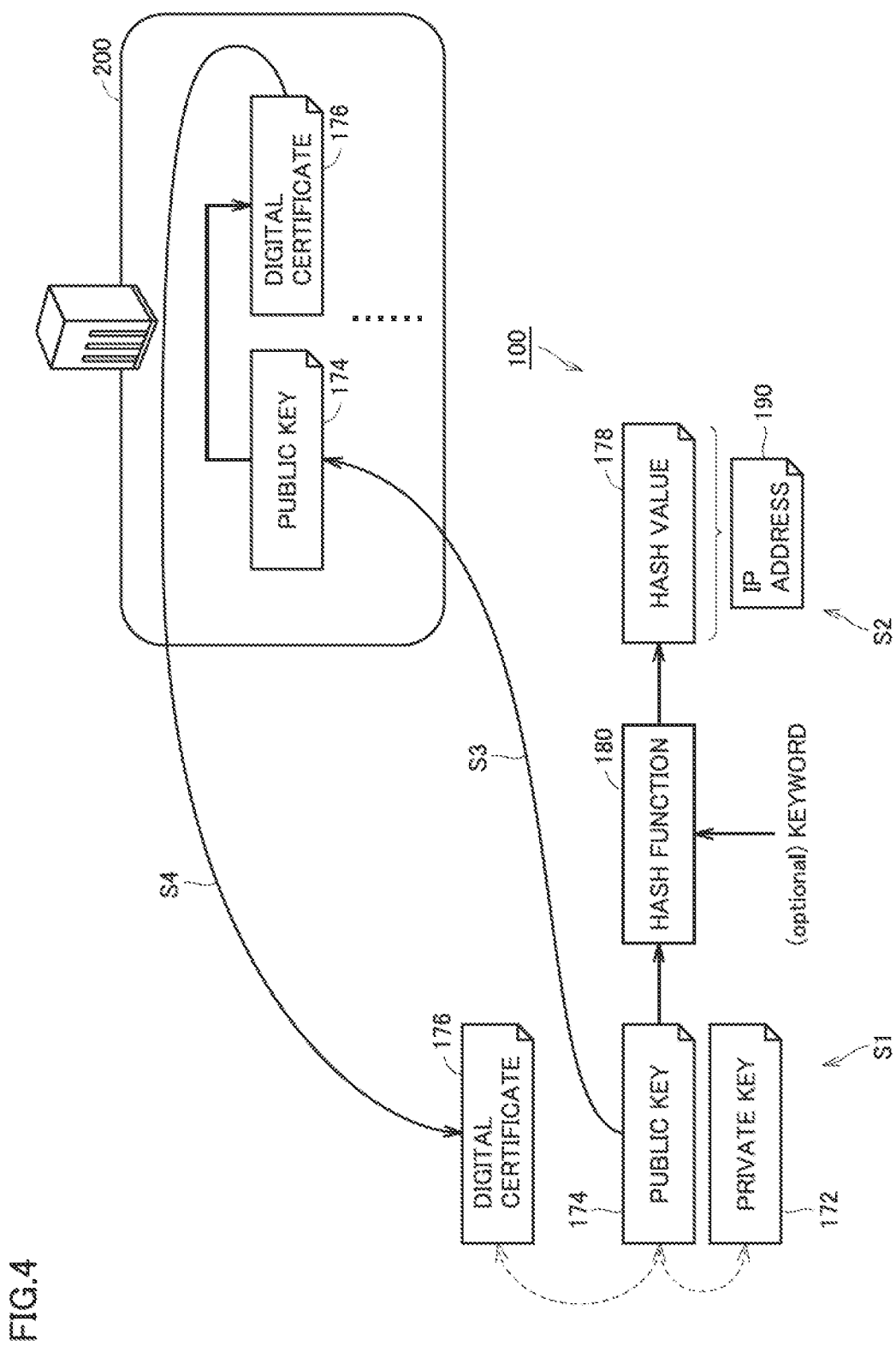
FIG. 4 is a diagram for describing an IP address authentication procedure in the network system according to the present embodiment.

FIG. 4 is a diagram for describing an IP address authentication procedure in the network system 1 according to the present embodiment. In addition, reference numerals such as "S1" to "S4" in FIG. 4 correspond to step numbers shown in FIG. 6.

Referring to FIG. 4, the device 100 has a key pair of the private key 172 and the public key 174. A hash value 178 is calculated by inputting the public key 174 into a predetermined hash function 180, and the entirety or part of the calculated hash value 178 is used as an IP address 190 of the device 100.

According to such a process of determining the IP address 190, the device 100 transmits the public key 174 to the certificate authority 200, and associates the digital certificate 176 issued by the certificate authority 200 with the public key 174. The device 100 transmits the public key 174 and the digital certificate 176 of the device itself to another device. Another device checks the validity of the IP address 190 of the device 100 based on the public key 174 and the digital certificate 176 published by the device 100. When the validity of the IP address 190 is confirmed, data communication is started using the IP address 190 whose validity has been confirmed. The device itself and another device can communicate directly with each other, but in addition to the direct communication processing, inquiry processing at the certificate authority 200 may be included.

As described above, in the network system 1 according to the present embodiment, the IP address 190 itself can be authenticated. By holding such an authenticated IP address 190 in the device itself, it is possible to build an independent network without using a statically or dynamically assigned IP address for each device.

Hereinafter, the details of the process for providing the authenticated IP address in the network system 1 according to the present embodiment will be described.

The private key 172 and the public key 174, which are a key pair, may be generated by the device 100 itself, or may be provided from the outside and stored in the device 100 in advance. When the private key 172 and the public key 174 are provided from the outside, the device 100 may acquire only the private key 172 and generate the public key 174 by itself.

As an example of a method of generating the private key 172 and the public key 174 which are a key pair, a bit string of a predetermined length (for example, 512 bits) generated by a random number generator may be used as the private key 172, and the public key 174 having a bit string of a predetermined length (for example, 256 bits) may be generated from the private key 172 according to a known cryptographic algorithm (for example, an elliptic curve cryptographic algorithm). In addition, when the device 100 itself generates the key pair, the random number generator may be realized by using the function provided by the OS 160, or may be realized by using a hard-wired circuit, such as an ASIC.

As the hash function 180, a known irreversible cryptographic hash function (for example, BLAKE) can be used.

The hash function 180 calculates the hash value 178 having a bit string of a predetermined length (for example, 256 bits).

Not only the public key 174 but also an arbitrary keyword may be input to the hash function 180. As an arbitrary keyword, a message associated with a predetermined organization may be used. As the message associated with a predetermined organization, a message including the name of the trademark owned by the predetermined organization may be used. For example, the name (for example, "connectFree") of a registered trademark owned by the predetermined organization may be used as a keyword to be input to the hash function 180. By adopting such an implementation method, it is possible to prevent a third party other than the predetermined organization from implementing the network system 1 according to the present embodiment, a relevant method or program, and the like without the permission of the predetermined organization.

The entirety or part of the hash value 178 calculated by the hash function 180 is used as the IP address 190. For example, when a 256-bit (64 digits in hexadecimal notation) hash value 178 is calculated, any 32 digits (for example, first 32 digits) of the 64-digit hash value 178 may be used as the IP address 190 (128 bits) corresponding to IPv6. Alternatively, the first eight digits of the 64-digit hash value 178 may be determined as the IP address 190 (32 bits) corresponding to IPv4.

Alternatively, a 128-bit hash value 178 may be calculated from the hash function 180 in consideration of the IP address 190 (128 bits) corresponding to IPv6. In this case, the entirety of the calculated hash value 178 can be determined as the IP address 190 (128 bits) corresponding to IPv6.

According to the present embodiment, the IP address 190 unique to the device 100 can be determined based on the public key 174 of the device 100. Thus, the device 100 can be connected to a network, such as the Internet, by using the IP address 190 determined by the device 100. In addition, even if there is no service provider (server) that manages the global IP address, such as an Internet service provider (ISP), the device 100 can perform data communication using the IP address 190 determined by itself. In addition, even if there is no server that manages private IP addresses such as a DHCP (Dynamic Host Configuration Protocol) server mounted on an access point or the like, the device 100 can perform data communication by making a connection to a global network, such as the Internet, using the IP address 190 determined by itself. Therefore, it is possible to improve the user experience and user convenience for connecting to a network, such as the Internet.

(c2: Unique Character String)

It may be possible to identify that the IP address 190 determined by the device 100 has been determined according to the processing procedure according to the present embodiment. In order to perform such identification, for example, the IP address 190 may include a predetermined eigenvalue (unique character string) for identification. That is, the determined IP address may include a predetermined eigenvalue (unique character string) for identification.

As an example, the first two digits (first and second digits from the beginning) of the IP address 190 in hexadecimal notation may be fixed to a predetermined unique character string (for example, "FC"). Usually, since the hash function 180 is a one-way function, the public key 174 cannot be calculated back from the IP address 190. For this reason, the private key 172 and the public key 174 may be repeatedly generated using a random number generator until the determined IP address 190 satisfies predetermined conditions (in this case, the first two digits become a predetermined eigenvalue). That is, the public key 174 may be determined so that the IP address 190 determined based on the hash value calculated from the public key 174 according to the hash function conforms to a predetermined format.

In this manner, by making a predetermined eigenvalue (for example, the first two digits are "FC") for identification be included in the IP address 190, a third party can determine whether or not the IP address 190 of the device 100 has been determined by the device 100 itself.

(c3: Type Identification Information)

The IP address 190 determined by the device 100 may include information by which the type of the device 100 can be identified. In order to perform such identification, for example, the IP address 190 may include a value corresponding to the type of the device 100. That is, the determined IP address 190 may include a value corresponding to the type of the device 100 that has determined the IP address 190.

As an example, a value (type identification information) corresponding to the type of the device 100 may be embedded in the third and fourth digits from the beginning of the IP address 190 in hexadecimal notation.

FIG. 5 is a diagram showing an example of type identification information embedded in the IP address used in the network system 1 according to the present embodiment. The type identification information shown in FIG. 5 may be stored in advance in the ROM 108 (see FIG. 2) of the control unit 110 of each device 100. As an example, a value corresponding to the type of device shown in FIG. 5 can be used.

As shown in FIG. 5, for example, when the type of the device 100 is a personal computer, a value "00" indicating the personal computer is set in the third and fourth digits from the beginning of the IP address 190.

As described above, since the hash function 180 is usually a one-way function, the public key 174 cannot be calculated back from the IP address 190. For this reason, the private key 172 and the public key 174 may be repeatedly generated using a random number generator until the determined IP address 190 satisfies predetermined conditions (in this case, the third and fourth digits from the beginning become a value indicating the type of the device 100). That is, the public key 174 may be determined so that the IP address 190 determined based on the hash value calculated from the public key 174 according to the hash function conforms to a predetermined format.

In this manner, by making the value indicating the type of the device 100 be included in the IP address 190, a third party can identify the type of the device 100 from the IP address 190 determined by the device 100.

(c4: Registration of Public Key 174 and Acquisition of Digital Certificate 176)

Next, the registration of the public key 174 and the acquisition of the digital certificate 176 will be described.

The device 100 acquires the digital certificate 176 for proving the validity of the public key 174 from the certificate authority 200. As a procedure for acquiring the digital certificate 176, the public key 174 is transmitted from the device 100 to the certificate authority 200 for registration, and the digital certificate 176 associated with the registered public key 174 is acquired from the certificate authority 200.

More specifically, the device 100 (control unit 110) transmits the public key 174 and a digital certificate issuance request (hereinafter, also referred to as a "certificate signing request") to the certificate authority 200 through the network. In response to the certificate signing request received from the device 100, the certificate authority 200 registers the public key 174 and issues the digital certificate 176 associated with the registered public key 174. Then, the certificate authority 200 transmits the digital certificate 176 to the device 100 through the network.

Typically, the digital certificate 176 includes owner information of the digital certificate 176 (in this example, the device 100), issuer information of the digital certificate 176 (in this example, the certificate authority 200), digital signature of the issuer, expiration date of the digital certificate 176, and the like.

The certificate authority 200 may be operated by a predetermined organization, or may be an intermediate certificate authority associated with a root certificate authority operated by a predetermined organization. In addition, in registering the public key 174 and issuing the digital certificate 176 associated with the public key 174, a predetermined fee and/or a maintenance fee may be required for a predetermined organization.

According to the present embodiment, the public key 174 is directly authenticated by the certificate authority 200 through the registration of the public key 174 and the acquisition of the public key 174, so that the IP address 190 determined based on the public key 174 is indirectly authenticated by the certificate authority 200. By such authentication by the certificate authority 200, the device 100 can realize data communication through the network by using the authenticated IP address 190.

In addition, the digital certificate 176 associated with the public key 174 may include information relevant to the attributes (hereinafter, also referred to as "attribute information") of the device 100 in order to improve confidentiality. As the attribute information of the device 100, for example, the version information of the OS 160 of the device 100 or the communication processing program 170 and the serial number of the hardware (for example, a processor or a storage) forming the device 100 can be used. In this case, the device 100 may transmit the attribute information of the device 100 to the certificate authority 200 when transmitting the public key 174 and the certificate signing request. In addition, the attribute information of the device 100 included in the digital certificate 176 may be encrypted by a known irreversible cryptographic hash function or the like.

In this manner, by making the attribute information of the device 100 be included in the digital certificate 176, it is possible to authenticate that the digital certificate 176 has been issued in response to the certificate signing request from the device 100 itself. That is, it is possible to more reliably prevent a device other than the device 100 from impersonating the device 100 and using the public key 174 and the digital certificate 176 of the device 100.

(c5: Processing Procedure)

Next, a processing procedure for providing an authenticated IP address in each device 100 will be described.

Figure 6:
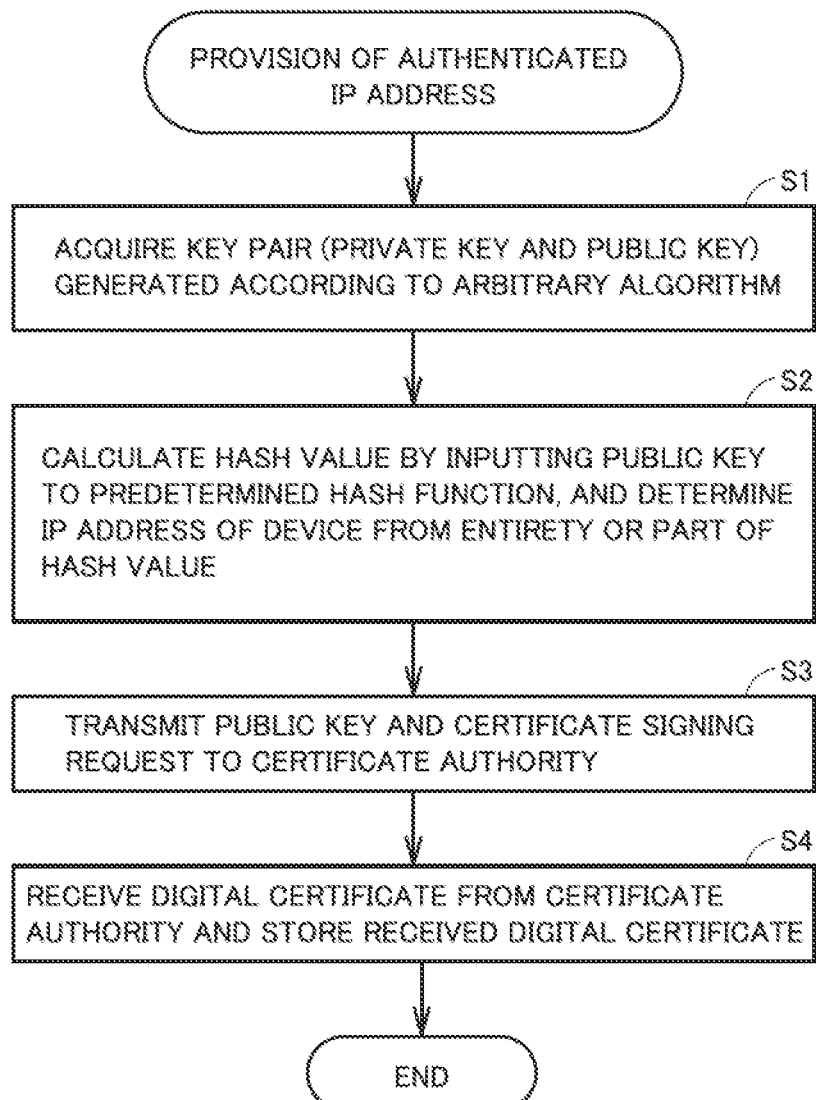
FIG. 6 is a flowchart showing a processing procedure in which a device provides an authenticated IP address in the network system according to the present embodiment.

FIG. 6 is a flowchart showing a processing procedure in which the device 100 provides an authenticated IP address in the network system 1 according to the present embodiment. The processing procedure shown in FIG. 6 is executed in each device 100, and each step shown in FIG. 6 is executed by the control unit 110 of each device 100.

Referring to FIG. 6, the device 100 acquires a key pair (the private key 172 and the public key 174) generated according to an arbitrary algorithm (step S1). This key pair may be generated by the device 100 itself, or may be acquired from the outside by the device 100. Alternatively, the device 100 may acquire only the private key 172 from the outside and generate the public key 174 internally.

Then, the device 100 calculates the hash value 178 by inputting the public key 174 to the predetermined hash function 180, and determines the IP address 190 of the device 100 from the entirety or part of the calculated hash value 178 (step S2). That is, the device 100 determines the IP address of the device itself based on the hash value 178 calculated from the public key 174 according to the hash function 180.

In addition, an appropriate key pair (the private key 172 and the public key 174) may be generated so that a unique character string (for example, the first and second digits from the beginning of the IP address 190) and/or type identification information (for example, the third and fourth digits from the beginning of the IP address 190) are included in the IP address 190.

In addition, the device 100 transmits the public key 174 and a digital certificate issuance request (certificate signing request) to the certificate authority 200 (step S3). In response to the certificate signing request received from the device 100, the certificate authority 200 registers the public key 174 and issues the digital certificate 176 associated with the registered public key 174. Then, the certificate authority 200 transmits the digital certificate 176 to the device 100 through the network. Then, the device 100 receives the digital certificate 176 from the certificate authority 200 and stores the digital certificate 176 (step S4).

In this manner, the device 100 acquires the digital certificate 176 associated with the public key 174 from the certificate authority.

In addition, the execution order of the processing of step S2 and the processing of steps S3 and S4 does not matter.

<D. Data Communication Processing>

Next, data communication processing between the devices 100 using the authenticated IP address will be described.

(d1: IP Address Notification)

First, a process relevant to IP address notification between the devices 100 in the network system 1 according to the present embodiment will be described.

Figure 7:
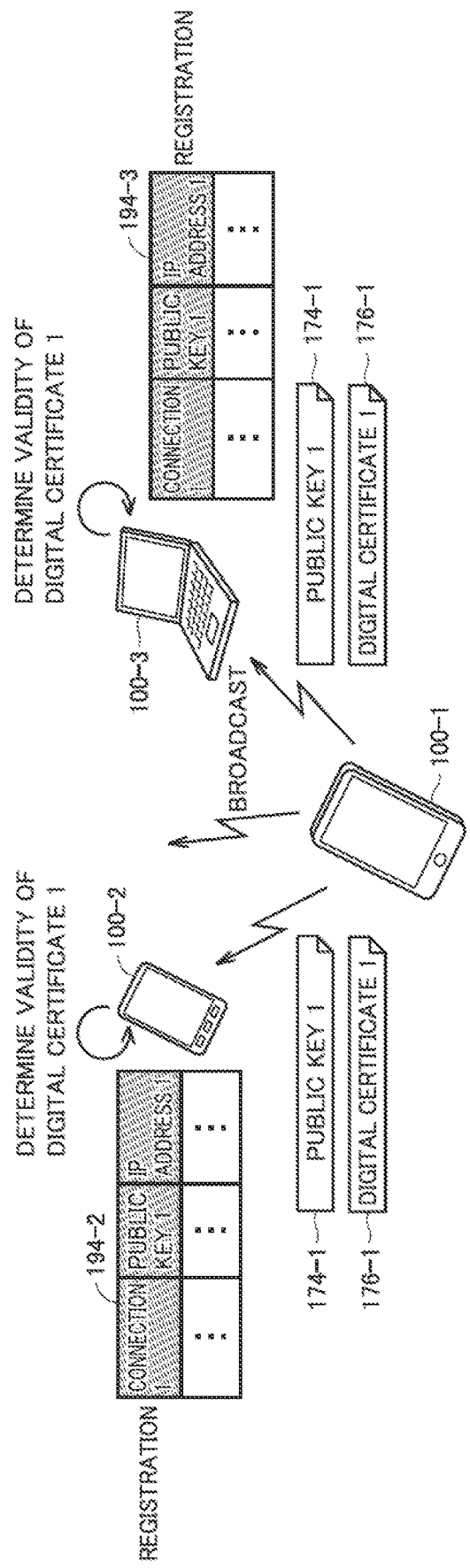
FIG. 7 is a diagram for describing a process relevant to IP address notification in the network system according to the present embodiment.
Figure 8:
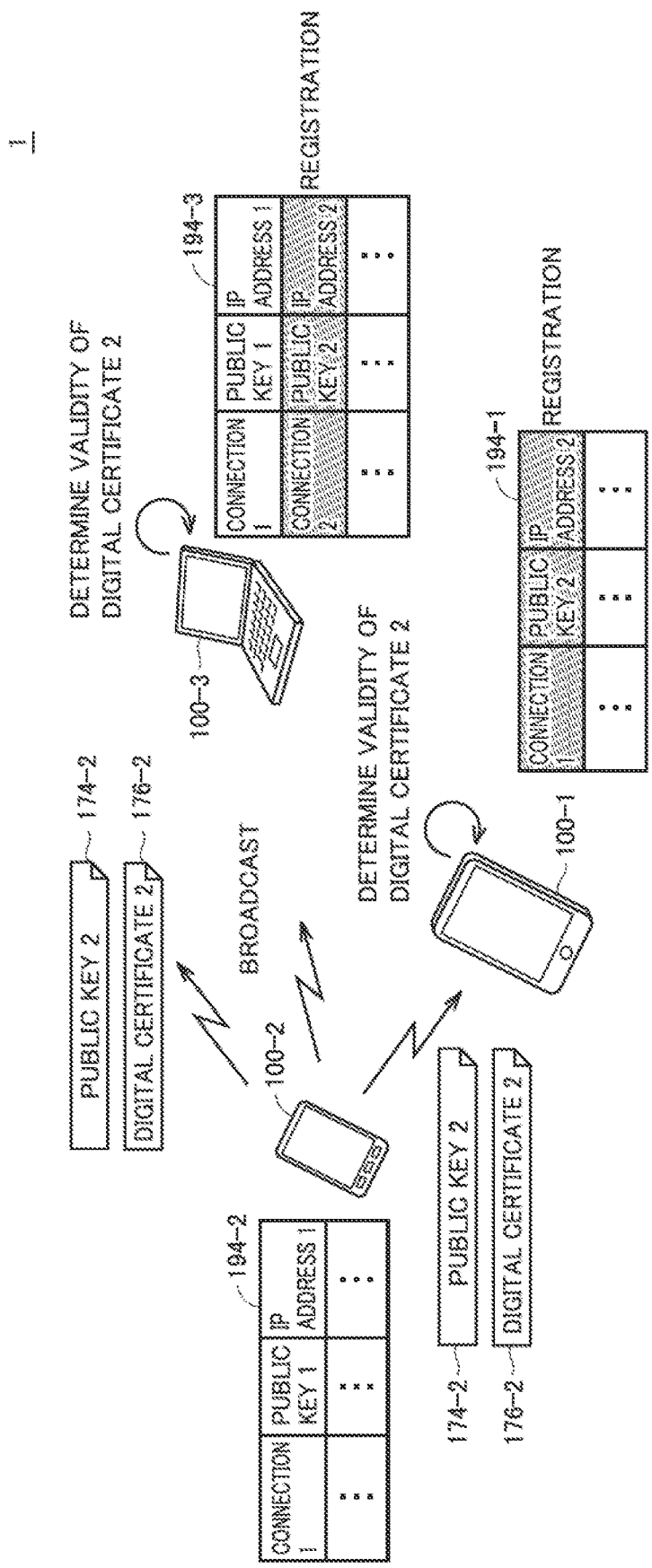
FIG. 8 is a diagram for describing a process relevant to IP address notification in the network system according to the present embodiment.

FIGS. 7 and 8 are diagrams for describing the process relevant to the IP address notification in the network system 1 according to the present embodiment. FIGS. 7 and 8 show examples of exchanging IP addresses between three devices 100-1, 100-2, and 100-3. In addition, the same processing can be performed between the two devices 100, or the same processing can be performed among a larger number of devices 100.

In the state shown in FIGS. 7 and 8, it is assumed that the devices 100-1, 100-2, and 100-3 have determined IP addresses 190-1, 190-2, and 190-3, respectively, according to the procedure described above and the devices 100-1, 100-2, and 100-3 have completed the registration of public keys 174-1, 174-2, and 174-3 in the certificate authority 200 and the acquisition of digital certificates 176-1, 176-2, and 176-3 from the certificate authority 200.

As shown in FIGS. 7 and 8, each device 100 transmits (broadcasts) the public key 174 and the digital certificate 176 associated with the public key 174 of each device regularly or every event. That is, each device 100 transmits the public key 174 and the digital certificate 176 to another device. In addition, if the public key 174 is included in the digital certificate 176, only the digital certificate 176 may be transmitted.

FIG. 7 shows an example in which the device 100-1 transmits (broadcasts) the public key 174-1 and the digital certificate 176-1 associated with the public key 174-1. In the example shown in FIG. 7, it is assumed that the devices 100-2 and 100-3 can receive the public key 174-1 and the digital certificate 176-1 transmitted from the device 100-1. Then, the devices 100-2 and 100-3 determine whether or not the digital certificate 176-1 is valid. If it is determined that the digital certificate 176-1 is valid, the devices 100-2 and 100-3 determine the IP address 190-1 of the device 100-1 based on the associated public key 174-1 and register these in connection tables 194-2 and 194-3, respectively.

Here, the connection table includes information of each device 100 for data communication, and each device 100 identifies the IP address of the destination device 100 or the like and establishes a necessary session with reference to the connection table. Here, the "session" means a logical communication path through which necessary data is exchanged prior to transmitting and receiving data, such as packets.

More specifically, the device 100-2 first determines whether or not the digital certificate 176-1 broadcast from the device 100-1 is valid. In the process of determining the validity, the integrity of the digital certificate 176-1 is verified.

As an example of the process for verifying integrity, first, the device 100-2 checks the owner information of the digital certificate 176-1, the issuer information of the digital certificate 176-1, and the presence of the issuer's digital signature. Then, the device 100-2 determines whether or not the digital certificate 176-1 is within the expiration date. In addition, the device 100-2 determines whether or not the issuer of the digital certificate 176-1 is reliable. In particular, when the digital certificate 176-1 is issued by an intermediate certificate authority, the device 100-2 identifies the root certificate authority associated with the intermediate certificate authority that has issued the digital certificate 176-1, and determines whether or not the identified root certificate authority is reliable. For example, when the identified root certificate authority matches one root certificate authority or any of a plurality of root certificate authorities stored in the device 100-1, it is determined that the issuer of the digital certificate 176-1 is reliable.

If the determination process described above is passed, the device 100-2 determines that the digital certificate 176-1 broadcast from the device 100-1 is valid. Then, the device 100-2 calculates a hash value 178-1 by inputting the public key 174-1 broadcast from the device 100-1 to the predetermined hash function 180, and determines the IP address 190-1 of the device 100-1 using the entirety or part of the calculated hash value 178-1. Here, it is assumed that the devices 100-1 and 100-2 have a common hash function 180. In addition, it is assumed that the process of determining the IP address 190-1 from the hash value 178-1 is also common between the devices 100-1 and 100-2.

Through the above processing, the device 100-2 can determine the IP address 190-1 of the device 100-1. Then, the device 100-2 adds the entry of the determined IP address 190-1 of the device 100-1 to the connection table 194-2. In addition, the public key 174-1 may be registered in association with the IP address 190-1.

In addition, the same processing as in the device 100-2 is executed in the device 100-3, and the entry of the determined IP address 190-1 of the device 100-1 is added to the connection table 194-3 of the device 100-3. The public key 174-1 may be registered in association with the IP address 190-1.

By the processing shown in FIG. 7, the device 100-2 and the device 100-3 can acquire the IP address 190-1 of the device 100-1.

FIG. 8 shows an example in which the device 100-2 transmits (broadcasts) the public key 174-2 and the digital certificate 176-2 associated with the public key 174-2. In the example shown in FIG. 8, it is assumed that the devices 100-1 and 100-3 can receive the public key 174-2 and the digital certificate 176-2 transmitted from the device 100-2. Then, the devices 100-1 and 100-3 determine whether or not the digital certificate 176-2 is valid. If it is determined that the digital certificate 176-2 is valid, the devices 100-1 and 100-3 determine the IP address 190-2 of the device 100-2 based on the associated public key 174-2 and register these in connection tables 194-1 and 194-3, respectively.

Since a series of processes executed by the devices 100-1 and 100-3 are the same as the processes described with reference to FIG. 7, the detailed description will not be repeated. By the processing shown in FIG. 8, the device 100-1 and the device 100-3 can acquire the IP address 190-2 of the device 100-2.

In addition, the device 100-3 may transmit (broadcast) the public key 174-3 and the digital certificate 176-3 associated with the public key 174-3. It is assumed that the devices 100-1 and 100-2 can receive the public key 174-3 and the digital certificate 176-3 transmitted from the device 100-3. Then, the devices 100-1 and 100-2 determine whether or not the digital certificate 176-3 is valid. If it is determined that the digital certificate 176-3 is valid, the devices 100-1 and 100-2 determine the IP address 190-3 of the device 100-3 based on the associated public key 174-3 and register these in the connection tables 194-1 and 194-2, respectively. By such processing, the device 100-1 and the device 100-2 can acquire the IP address 190-3 of the device 100-3.

Figure 9:
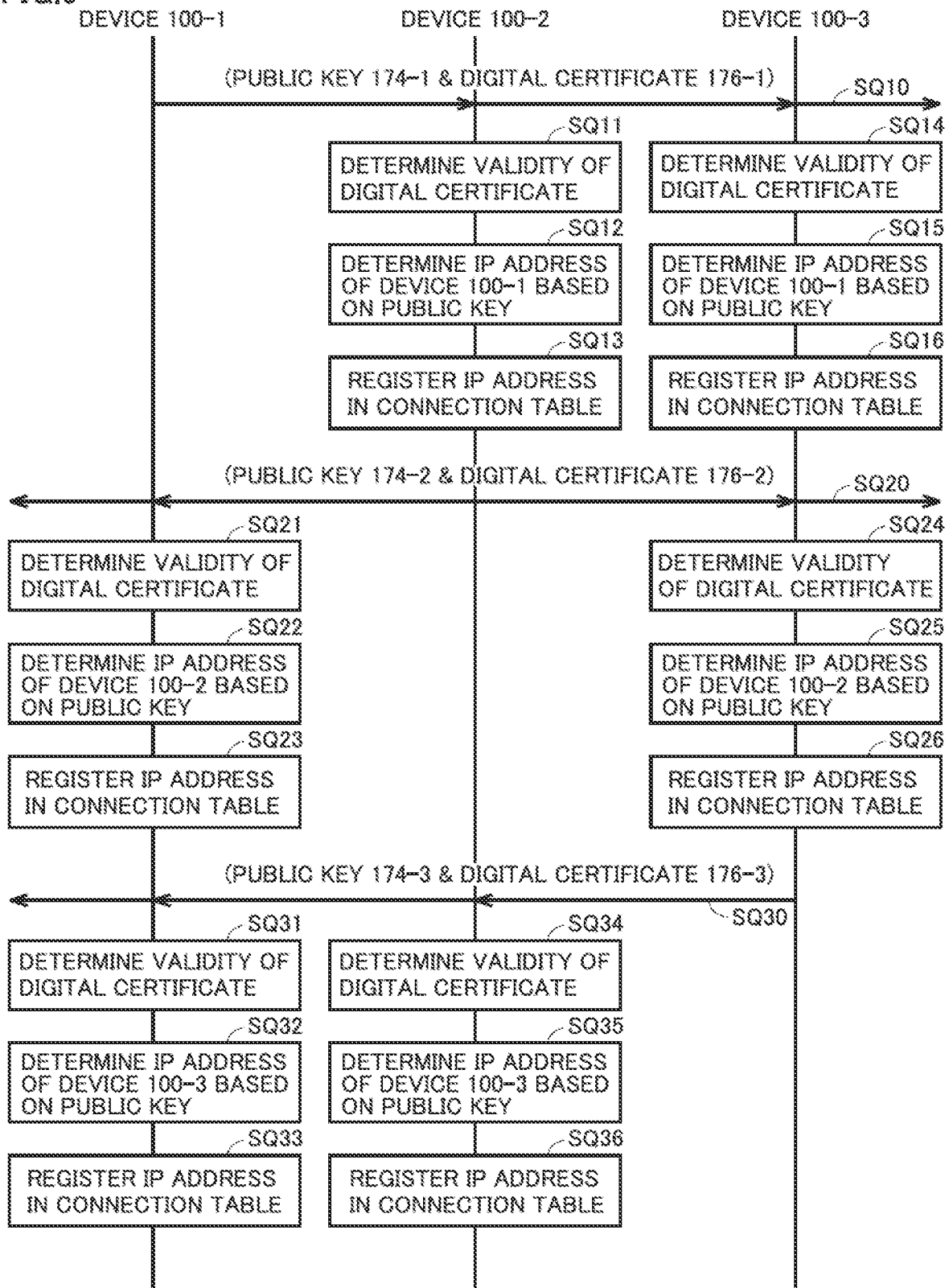
FIG. 9 is a sequence chart showing a processing procedure relevant to IP address notification in the network system according to the present embodiment.

FIG. 9 is a sequence chart showing a processing procedure relevant to IP address notification in the network system 1 according to the present embodiment. FIG. 9 shows processing procedures in the three devices 100-1, 100-2, and 100-3 so as to correspond to FIGS. 7 and 8.

The device 100-1 transmits (broadcasts) the public key 174-1 and the digital certificate 176-1 associated with the public key 174-1 (sequence SQ10).

Upon receiving the public key 174-1 and the digital certificate 176-1 transmitted from the device 100-1, the device 100-2 determines the validity of the digital certificate 176-1 (sequence SQ11). When it is determined that the digital certificate 176-1 is valid, the device 100-2 determines the IP address 190-1 of the device 100-1 based on the public key 174-1 (sequence SQ12), and registers the determined IP address 190-1 of the device 100-1 in the connection table 194-2 (sequence SQ13).

Similarly, upon receiving the public key 174-1 and the digital certificate 176-1 transmitted from the device 100-1, the device 100-3 determines the validity of the digital certificate 176-1 (sequence SQ14). When it is determined that the digital certificate 176-1 is valid, the device 100-3 determines the IP address 190-1 of the device 100-1 based on the public key 174-1 (sequence SQ15), and registers the determined IP address 190-1 of the device 100-1 in the connection table 194-3 (sequence SQ16).

In addition, the device 100-2 transmits (broadcasts) the public key 174-2 and the digital certificate 176-2 associated with the public key 174-2 (sequence SQ20).

Upon receiving the public key 174-2 and the digital certificate 176-2 transmitted from the device 100-2, the device 100-1 determines the validity of the digital certificate 176-2 (sequence SQ21). When it is determined that the digital certificate 176-2 is valid, the device 100-1 determines the IP address 190-2 of the device 100-2 based on the public key 174-2 (sequence SQ22), and registers the determined IP address 190-2 of the device 100-2 in the connection table 194-1 (sequence SQ23).

Similarly, upon receiving the public key 174-2 and the digital certificate 176-2 transmitted from the device 100-2, the device 100-3 determines the validity of the digital certificate 176-2 (sequence SQ24). When it is determined that the digital certificate 176-2 is valid, the device 100-3 determines the IP address 190-2 of the device 100-2 based on the public key 174-2 (sequence SQ25), and registers the determined IP address 190-2 of the device 100-2 in the connection table 194-3 (sequence SQ26).

In addition, the device 100-3 transmits (broadcasts) the public key 174-3 and the digital certificate 176-3 associated with the public key 174-3 (sequence SQ30).

Upon receiving the public key 174-3 and the digital certificate 176-3 transmitted from the device 100-3, the device 100-1 determines the validity of the digital certificate 176-3 (sequence SQ31). When it is determined that the digital certificate 176-3 is valid, the device 100-1 determines the IP address 190-3 of the device 100-3 based on the public key 174-3 (sequence SQ32), and registers the determined IP address 190-3 of the device 100-3 in the connection table 194-1 (sequence SQ33).

Similarly, upon receiving the public key 174-3 and the digital certificate 176-3 transmitted from the device 100-3, the device 100-2 determines the validity of the digital certificate 176-3 (sequence SQ34). When it is determined that the digital certificate 176-3 is valid, the device 100-2 determines the IP address 190-3 of the device 100-3 based on the public key 174-3 (sequence SQ35), and registers the determined IP address 190-3 of the device 100-3 in the connection table 194-2 (sequence SQ36).

In addition, the processes of sequences SQ10 to SQ16, the processes of sequences SQ20 to SQ26, and the processes of sequences SQ30 to SQ36 can be executed in any order or in parallel.

Thus, when the public key 174 and the digital certificate 176 associated with the public key 174 are received from another device, each device 100 determines the validity of the digital certificate 176 (sequences SQ11, SQ14, SQ21, SQ24, SQ31, and SQ34). Then, when it is determined that the digital certificate 176 is valid, each device 100 determines the IP address of another device based on the hash value calculated from the public key 174 according to the hash function (sequences SQ12, SQ15, SQ22, SQ25, SQ32, and SQ35).

As described above, in the network system 1 according to the present embodiment, on the condition that the digital certificate 176 transmitted from another device 100 is determined to be valid, the IP address 190 of another device 100 is determined based on the public key 174 associated with the digital certificate 176. Since the IP address 190 is determined based on the public key 174 on the condition that the digital certificate 176 associated with the public key 174 is valid, the validity of the public key 174 and the validity of the IP address 190 can be guaranteed. Therefore, it is possible to realize reliable data communication between the devices 100.

In addition, in the network system 1 according to the present embodiment, since the IP address of each device 100 can be known based on the public key 174 broadcast from each device 100, the devices 100 can be directly connected to each other even if there is no server that manages IP addresses. In particular, even if there is no virtual private network (VPN) server or the like, it is possible to realize communication in which confidentiality is ensured between the devices 100, so that the cost and power consumption for maintaining the VPN server can be reduced.

(d2: Data Communication)

Next, processing relevant to data communication between the devices 100 will be described. In the network system 1 according to the present embodiment, each device 100 has a routing function and a data transmission function. Due to such functions, it is possible to realize a network capable of independently performing data communication.

In addition, in the network system 1 according to the present embodiment, data to be data-communicated (typically, a packet or a frame) is encrypted by using an encryption key set for each session. Therefore, the confidentiality of data communication can be guaranteed.

First, an outline of data communication in the network system 1 according to the present embodiment will be described. In the following description, as a typical example, it is assumed that data is transmitted in the form of a "packet".

Figure 10:
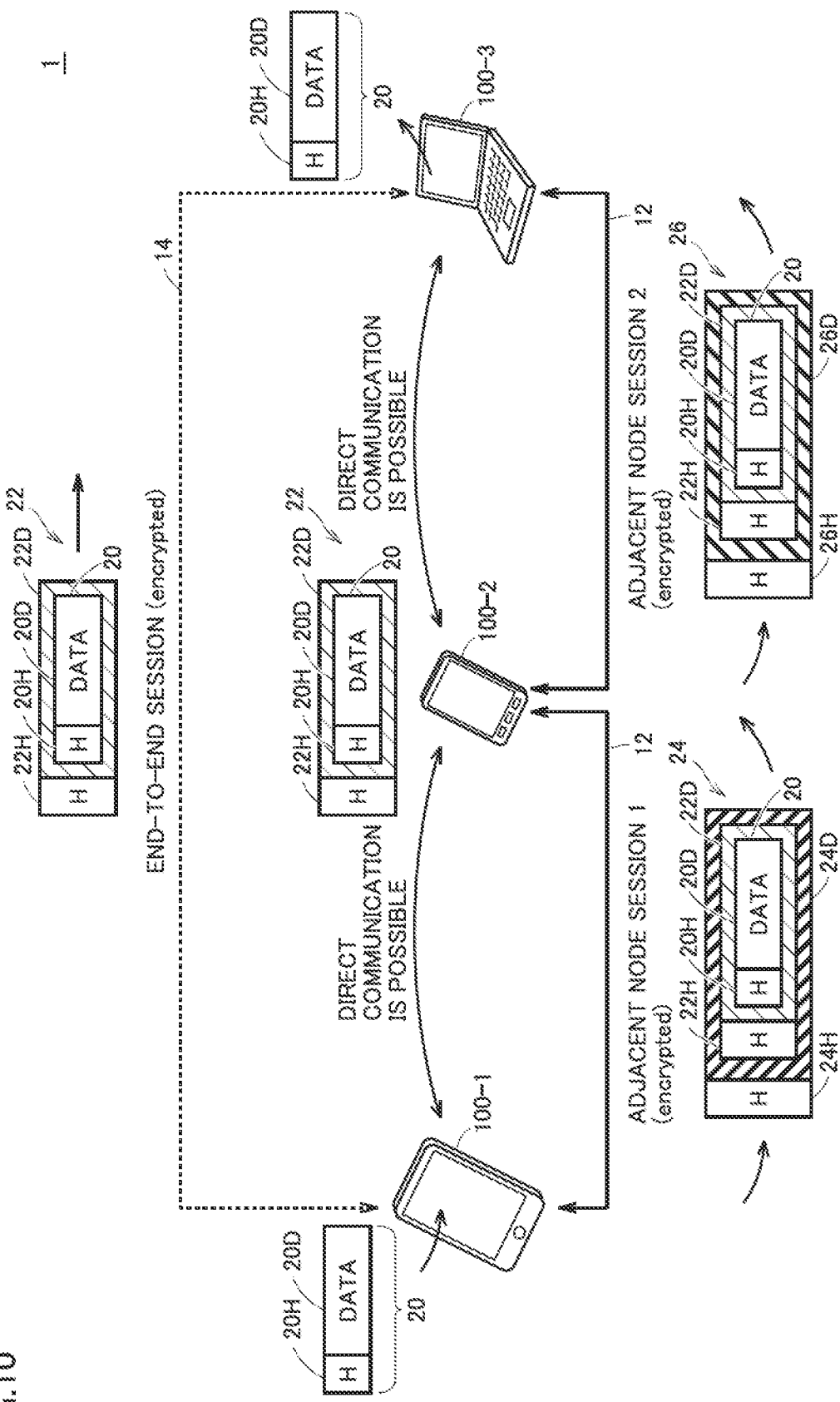
FIG. 10 is a diagram for describing the outline of data communication in the network system according to the present embodiment.

FIG. 10 is a diagram for describing the outline of data communication in the network system 1 according to the present embodiment. FIG. 10 describes, as an example, a data transmission method in a network including the three devices 100-1, 100-2, and 100-3.

In FIG. 10, as an example, direct communication is possible between the device 100-1 and the device 100-2, and direct communication is possible between the device 100-2 and the device 100-3. However, it is assumed that direct communication is not possible between the device 100-1 and the device 100-3. Here, the state in which direct communication is possible typically means a connection state in which the nodes are present within one hop. A process of transmitting a packet from the device 100-1 to the device 100-3 in such a connection state will be described.

In the network system 1 according to the present embodiment, a two-stage session is established. More specifically, the two-stage session includes an adjacent node session 12, which is a first-stage session, an end-to-end session 14, which is a second-stage session.

The adjacent node session 12 is a session established between the devices 100 between which direct communication is possible. In the example shown in FIG. 10, the adjacent node session 12 is established between the device 100-1 and the device 100-2 and between the device 100-2 and the device 100-3. On the other hand, the end-to-end session 14 is a session established between the transmission source device 100 and the destination device 100.

In each of the adjacent node session 12 and the end-to-end session 14, each packet is encrypted. Typically, encryption keys used between the nodes are exchanged or shared during the process of establishing each session. As a result, in the end-to-end session 14, an encrypted packet 22 obtained by encrypting a packet to be transmitted (hereinafter, also referred to as a "transmission packet 20") based on the encryption key exchanged or shared between the device 100-1 and the device 100-3 is exchanged. The transmission packet 20 includes a data body portion 20D and a header portion 20H including information, such as a destination. The encrypted packet 22 includes an encryption result of the entire transmission packet 20 as a data body portion 22D, and further includes a header portion 22H including information, such as a destination. By adopting such a data structure, it is possible to realize packet transmission to the destination device while maintaining the confidentiality of the transmission packet 20 included in the data body portion 22D.

In the adjacent node session 12, an encrypted packet 24 obtained by further encrypting the encrypted packet 22 based on another encryption key exchanged or shared between the device 100-1 and the device 100-2 is exchanged. In addition, an encrypted packet 26 obtained by further encrypting the encrypted packet 22 based on still another encryption key exchanged or shared between the device 100-2 and the device 100-3 is exchanged.

The encrypted packet 24 includes an encryption result of the entire encrypted packet 22 as a data body portion 24D, and further includes a header portion 24H including information, such as a destination. Similarly, the encrypted packet 26 includes an encryption result of the entire encrypted packet 22 as a data body portion 26D, and further includes a header portion 26H including information, such as a destination.

In addition, in the device 100-2, the encrypted packet 24 is once decrypted into the encrypted packet 22 and then encrypted again to generate the encrypted packet 26. Even in this case, since the device 100-2 cannot decrypt the encrypted packet 22 generated in the end-to-end session 14, the confidentiality of the data communication is ensured.

In the data transmission method shown in FIG. 10, the device 100-1 generates the encrypted packet 22 by encrypting the transmission packet 20 addressed to the device 100-2 with an encryption key associated with the device 100-2. Then, the device 100-1 determines a device (device 100-2 in the example shown in FIG. 10) to be a transmission destination of the encrypted packet 22, generates the encrypted packet 24 by encrypting the encrypted packet 22 with an encryption key associated with the determined device, and transmits the encrypted packet 24 to the determined device.

The device 100-2 that has received the encrypted packet 24 decrypts the encrypted packet 24 into the encrypted packet 22, and determines whether or not the decrypted encrypted packet 22 is addressed to the device itself. Then, if the decrypted encrypted packet 22 is not addressed to the device itself, the device 100-2 executes the same processing as that of the device 100-1 transmitting the encrypted packet 24 to the device 100-2. That is, the device 100-2 determines a device (in this case, the device 100-3) to be a further transmission destination of the encrypted packet 22, generates the encrypted packet 26 by encrypting the encrypted packet 22 with an encryption key associated with the determined device, and transmits the encrypted packet 26 to the determined device.

On the other hand, if the decrypted encrypted packet 22 is addressed to the device itself (in the example shown in FIG. 10, when the encrypted packet 22 reaches the device 100-3), the encrypted packet 22 is decrypted into the transmission packet 20.

Figure 11:
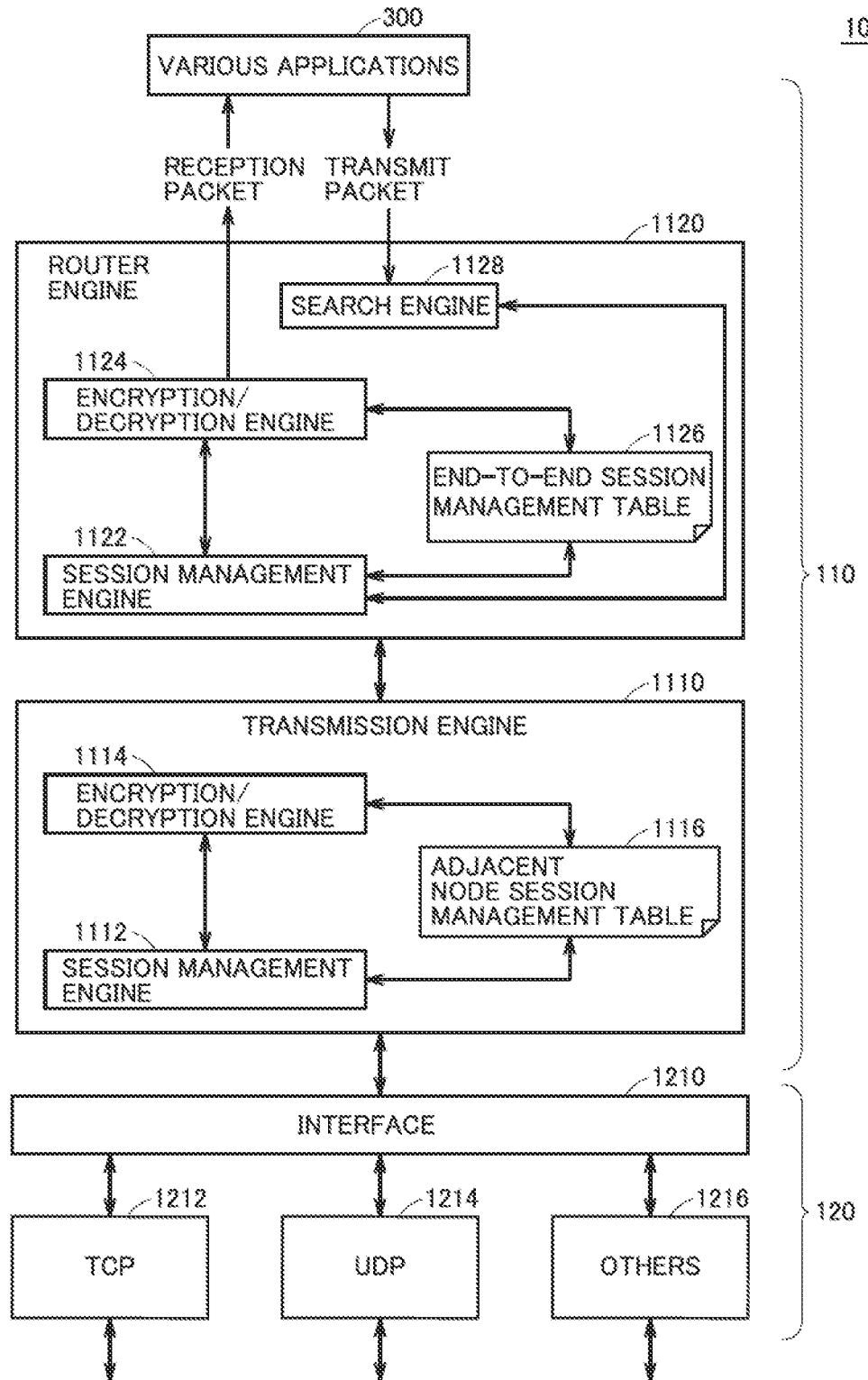
FIG. 11 is a schematic diagram showing a functional configuration relevant to data transmission in the device according to the present embodiment.

FIG. 11 is a schematic diagram showing a functional configuration relevant to data transmission in the device 100 according to the present embodiment. Referring to FIG. 11, the device 100 includes a router engine 1120, a transmission engine 1110, and an interface 1210 as a configuration for realizing data communication as shown in FIG. 10. These components are provided by the control unit 110.

The router engine 1120 is mainly responsible for the end-to-end session 14, and the transmission engine 1110 is mainly responsible for the adjacent node session 12.

When a transmission packet is given by various applications 300, the router engine 1120 encrypts the transmission packet using the encryption key exchanged or exchanged between the device itself and the destination device 100, and transmits an encrypted packet including the encrypted transmission packet to the destination device 100.

In addition, when the encrypted packet is given from the transmission engine 1110, the router engine 1120 determines whether or not the encrypted packet is addressed to the device itself. In the case of an encrypted packet addressed to the device itself, the router engine 1120 decrypts the transmission packet included in the encrypted packet as a received packet (hereinafter, also referred to as a "reception packet") using the encryption key exchanged or shared between the device itself and the transmission source device 100, and outputs the decrypted transmission packet to the various applications 300. On the other hand, in the case of an encrypted packet addressed to another device, the router engine 1120 returns the encrypted packet to the transmission engine 1110.

More specifically, the router engine 1120 includes a session management engine 1122, an encryption/decryption engine 1124, an end-to-end session management table 1126, and a search engine 1128.

The session management engine 1122 performs session establishment, packet transmission processing, packet retransmission processing, and the like between the device itself and the destination device 100. In addition, the session management engine 1122 determines the transmission destination of the transmission packet according to the destination of the given transmission packet. The encryption/decryption engine 1124 encrypts and decrypts the data. The end-to-end session management table 1126 holds the IP address, encryption key, connection type, and the like of the device 100 for which the session management engine 1122 can establish a session. The search engine 1128 searches for the device 100 having the specified IP address on the network and its route when the IP address specified by the various applications 300 is not registered in the end-to-end session management table 1126.

When a packet is given from the interface 1210, the transmission engine 1110 decrypts the packet using the encryption key exchanged or exchanged between the device itself and the device 100 to which the packet is directly data-communicated, and then outputs the decrypted packet to the router engine 1120. In addition, when a packet is given from the router engine 1120, the transmission engine 1110 encrypts the packet using the encryption key exchanged or exchanged between the device itself and the device 100 to which the packet is directly data-communicated, and then transmits the encrypted packet to the destination device 100.

More specifically, the transmission engine 1110 includes a session management engine 1112, an encryption/decryption engine 1114, and an adjacent node session management table 1116.

The session management engine 1112 performs session establishment, packet transmission processing, packet retransmission processing, and the like between the device itself and the destination device 100 to which the packet is directly data-communicated. The encryption/decryption engine 1114 encrypts and decrypts the data. The adjacent node session management table 1116 holds the IP address, encryption key, connection type, and the like of the device 100 for which the session management engine 1112 can establish a session.

The interface 1210 is a module that logically processes data physically exchanged by the network interface 120. The interface 1210 logically connects the session management engine 1112 and a data communication path prepared for each protocol (for example, a TCP (Transmission Control Protocol) 1212, a UDP (User Datagram Protocol) 1214, and other protocols 1216).

Figure 12:
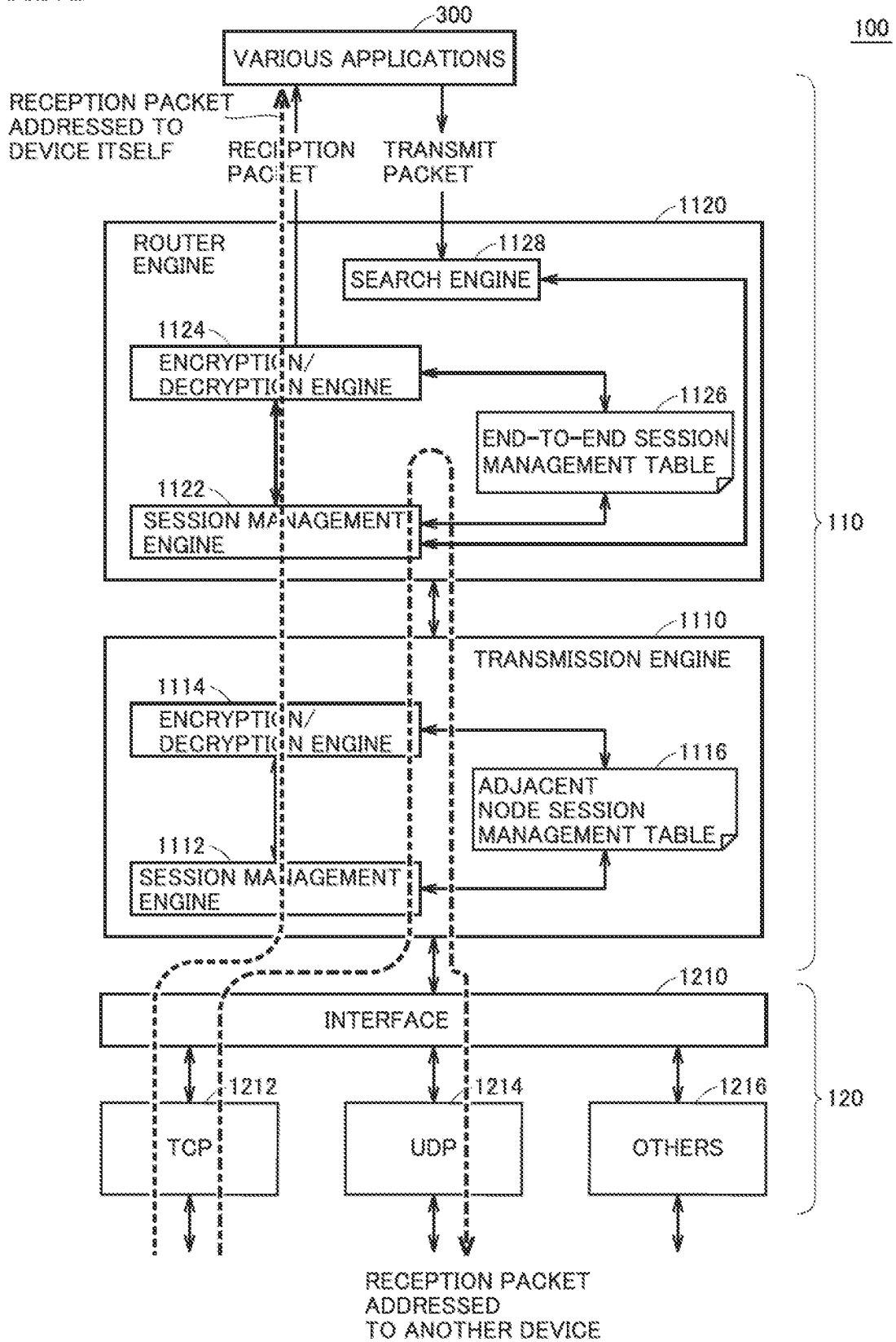
FIG. 12 is a schematic diagram showing an operation example at the time of data transmission in the device according to the present embodiment.

FIG. 12 is a schematic diagram showing an operation example at the time of data transmission in the device 100 according to the present embodiment. FIG. 12 shows processing when the device 100 receives a packet addressed to the device itself (reception packet addressed to the device itself) and processing when the device 100 receives a packet addressed to another device (reception packet addressed to another device).

When a packet arrives at the device 100, the packet is transmitted to the transmission engine 1110 and decrypted using the encryption key exchanged or exchanged between the device 100 and the device 100 to which the packet is directly data-communicated. When the packet is addressed to the device itself, the decrypted packet is transmitted to the router engine 1120 and further decrypted using the encryption key exchanged or exchanged between the device itself and the transmission source device 100, and output to the various applications 300. On the other hand, when the packet is addressed to another device, the decrypted packet is returned to the transmission engine 1110 and encrypted using the encryption key exchanged or exchanged between the device itself and the next destination device, and then transmitted.

Figure 13:
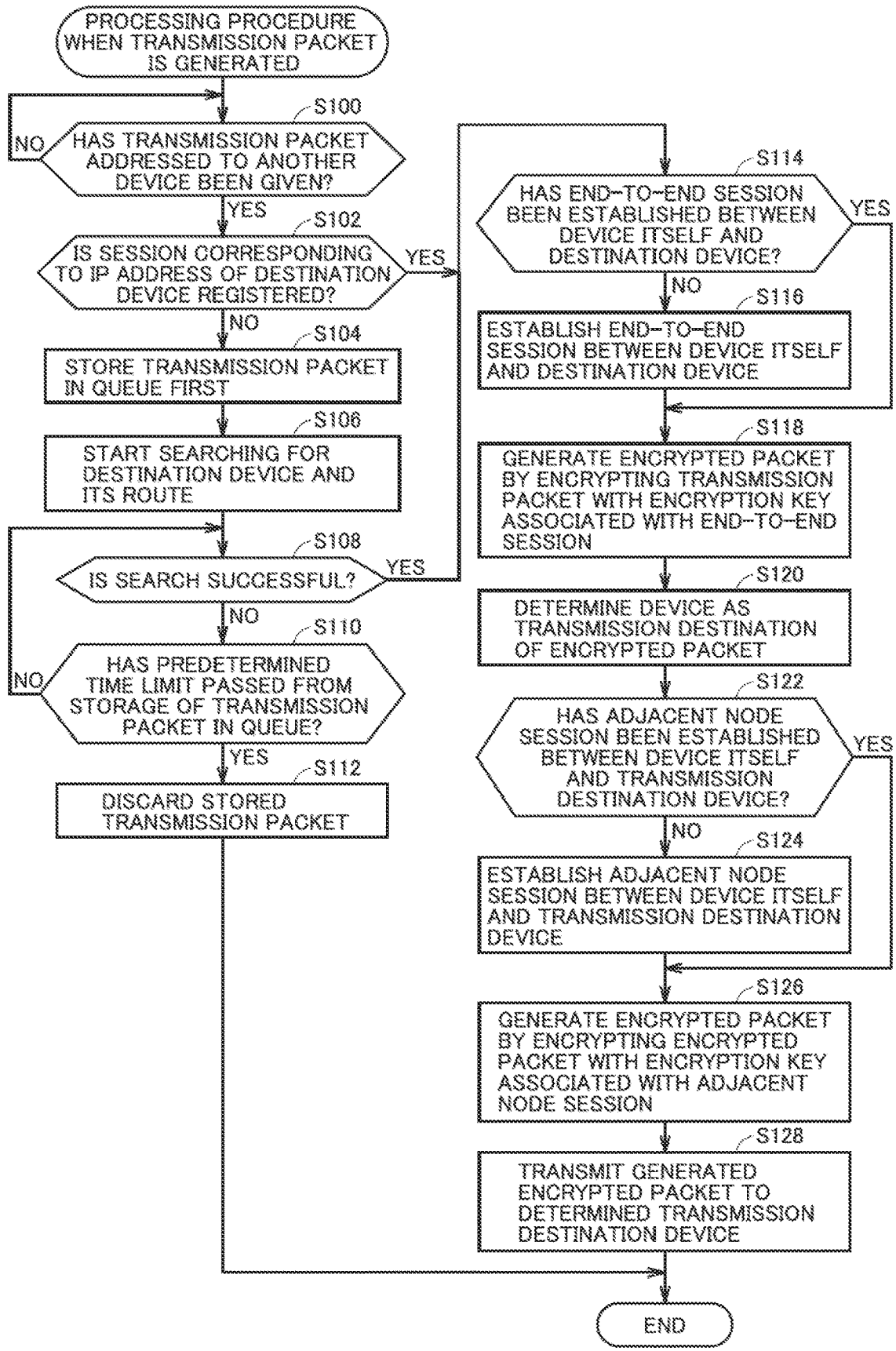
FIG. 13 is a flowchart showing a processing procedure when a transmission packet is generated in the device according to the present embodiment.
Figure 14:
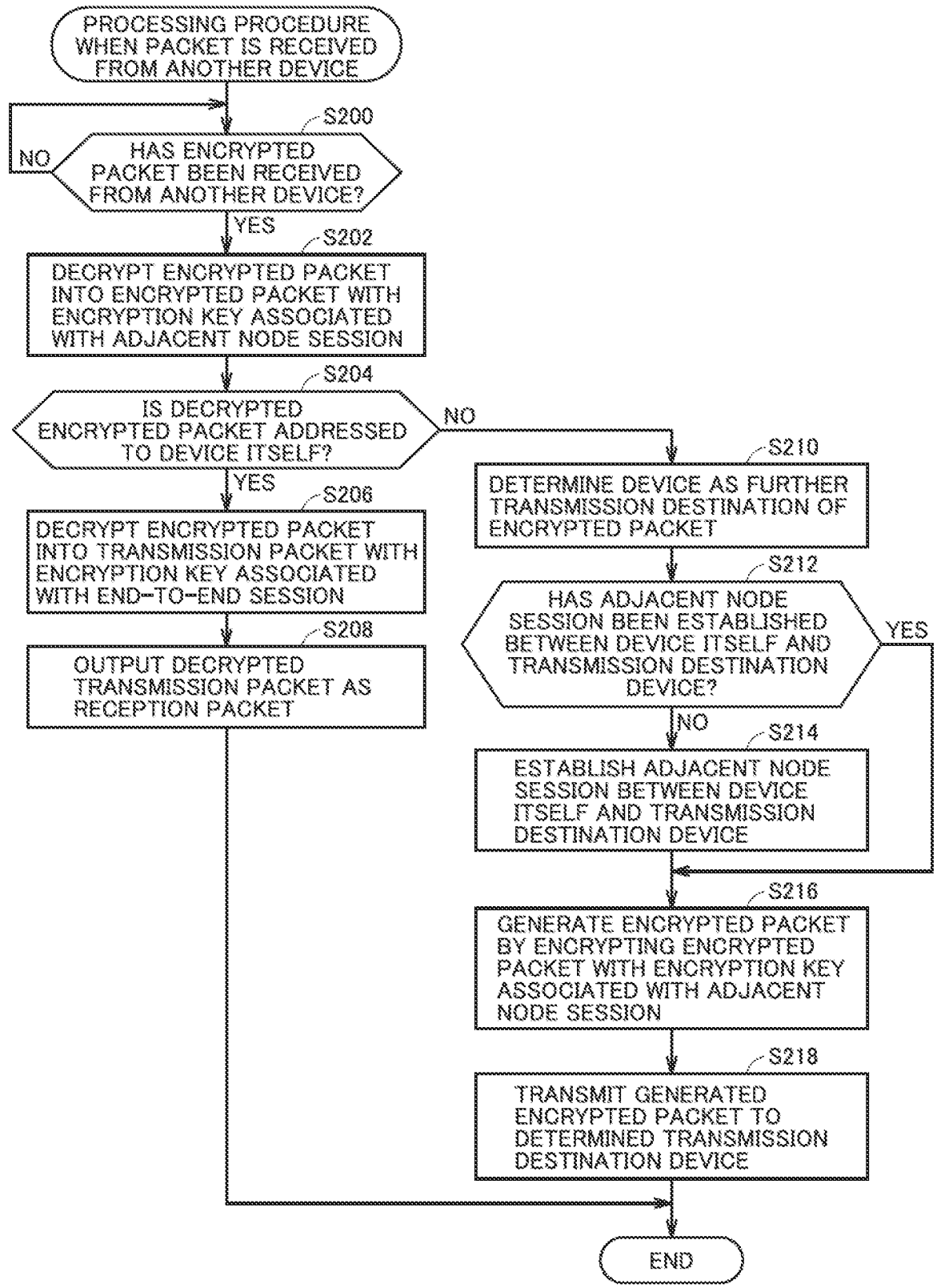
FIG. 14 is a flowchart showing a processing procedure when a packet is received from another device in the device according to the present embodiment.

FIG. 13 is a flowchart showing a processing procedure when a transmission packet is generated in the device 100 according to the present embodiment. FIG. 14 is a flowchart showing a processing procedure when a packet is received from another device in the device 100 according to the present embodiment. FIGS. 13 and 14 show a procedure of a communication processing method in the device 100 connected to the network. Each step shown in FIGS. 13 and 14 is executed by the control unit 110 (see FIG. 2) of the device 100 (typically realized by the cooperation of a processor and a memory).

Referring to FIG. 13, it is determined whether or not the transmission packet 20 addressed to another device has been given by the various applications 300 or the like (step S100). If the transmission packet 20 addressed to another device has not been given (NO in step S100), the processing of step S100 is repeated.

On the other hand, if the transmission packet 20 addressed to another device has been given (YES in step S100), the processing of step S102 and steps subsequent thereto is executed. That is, the processing of step S102 and steps subsequent thereto shown in FIG. 13 is executed when a packet addressed to another device is given.

In step S102, the device 100 (session management engine 1122 in FIG. 11) determines whether or not a session corresponding to the IP address of the destination device is registered (step S102). Typically, the IP address for each session that can be established is registered in the end-to-end session management table 1126 shown in FIG. 11, so that the registered content is referred to.

If the session corresponding to the IP address of the destination device is registered (YES in step S102), the processing of step S114 described later is executed.

If the session corresponding to the IP address of the destination device is not registered (NO in step S102), the device 100 (search engine 1128 in FIG. 11) first stores the transmission packet 20 in a queue (step S104), and starts searching for a destination device and a route to the destination device for each data communication path (step S106). Then, the device 100 determines whether or not the search is successful (step S108). If the search is successful (YES in step S108), the processing of step S114 described later is executed. In this manner, when a packet addressed to another device is given, the device 100 searches for the IP address of the destination device.

On the other hand, if the search is not successful (NO in step S108), the device 100 determines whether or not a predetermined time limit (timeout time) has passed from the storage of the transmission packet 20 in the queue (step S110). If the predetermined time limit has not passed from the storage of the transmission packet 20 in the queue (NO in step S110), the processing of step S108 and steps subsequent thereto is repeated.

On the other hand, if the predetermined time limit has passed from the storage of the transmission packet 20 in the queue (YES in step S110), the device 100 discards the transmission packet 20 stored in the queue (step S112). Then, the process ends.

In step S114, the device 100 (session management engine 1122 in FIG. 11) determines whether or not the end-to-end session 14 has been established between the device itself and the destination device (step S114).

If no end-to-end session 14 has been established between the device itself and the destination device (NO in step S114), the device 100 establishes the end-to-end session 14 between the device itself and the destination device (step S116). When establishing the end-to-end session 14, the device 100 exchanges or shares the encryption key associated with the end-to-end session 14 with the destination device. In this manner, the device 100 establishes the end-to-end session 14 between the device itself and another device and determines the encryption key associated with the end-to-end session 14 (that is, another device).

On the other hand, if the end-to-end session 14 has already been established between the device itself and the destination device (YES in step S114), the processing of step S116 is skipped.

Then, the device 100 (encryption/decryption engine 1124) generates the encrypted packet 22 by encrypting the transmission packet 20 with the encryption key associated with the end-to-end session 14 established between the device itself and the destination device (step S118). That is, the device 100 generates the encrypted packet 22 by performing encryption with the encryption key associated with another destination device.

Then, the device 100 (session management engine 1112) determines a device to be a transmission destination of the encrypted packet 22 (step S120). Typically, the IP address for each session that can be established is registered in the adjacent node session management table 1116 shown in FIG. 11, so that the registered content is referred to. In addition, the device 100 (encryption/decryption engine 1114) determines whether or not the adjacent node session 12 has been established between the device itself and the determined transmission destination device (step S122).

If no adjacent node session 12 has been established between the device itself and the determined transmission destination device (NO in step S122), the device 100 establishes the adjacent node session 12 between the device itself and the determined transmission destination device (step S124). When establishing the adjacent node session 12, the device 100 exchanges or shares the encryption key associated with the adjacent node session 12 with the target device. In this manner, the device 100 establishes the adjacent node session 12 between the device itself and still another device to be a transmission destination of the encrypted packet 22, and determines the encryption key associated with the adjacent node session 12 (that is, the device to be a transmission destination).

On the other hand, if the adjacent node session 12 has already been established between the device itself and the determined transmission destination device (YES in step S122), the processing of step S124 is skipped.

Then, the device 100 (encryption/decryption engine 1114) generates the encrypted packet 24 by encrypting the encrypted packet 22 with the encryption key associated with the adjacent node session 12 established between the device itself and the determined transmission destination device (step S126). That is, the device 100 generates the encrypted packet 24 by encrypting the encrypted packet 22 with the encryption key associated with the determined transmission destination device.

Finally, the device 100 (session management engine 1112) transmits the generated encrypted packet 24 to the determined transmission destination device (step S128). As described above, the process when the transmission packet 20 is given ends.

Referring to FIG. 14, it is determined whether or not the encrypted packet 24 has been received from another device (step S200). If the encrypted packet 24 has not been received from another device (NO in step S200), the processing of step S200 is repeated.

On the other hand, if the encrypted packet 24 has been received from another device (YES in step S200), the processing of step S202 and steps subsequent thereto is executed. That is, the processing of step S202 and steps subsequent thereto shown in FIG. 14 is executed when the encrypted packet 24 is received from another device.

The device 100 (encryption/decryption engine 1114) decrypts the encrypted packet 24 into the encrypted packet 22 with the encryption key associated with the adjacent node session 12 between the device itself and another device (step S202). Then, the device 100 (session management engine 1112) determines whether or not the decrypted encrypted packet 22 is addressed to the device itself (step S204).

If the decrypted encrypted packet 22 is not addressed to the device itself (NO in step S204), the device 100 (session management engine 1112) determines a device to be a further transmission destination of the encrypted packet 22 (step S210). Typically, the adjacent node session management table 1116 shown in FIG. 11 is referred to. In addition, the device 100 (encryption/decryption engine 1114) determines whether or not the adjacent node session 12 has been established between the device itself and the determined transmission destination device (step S212). If no adjacent node session 12 has been established between the device itself and the determined transmission destination device (NO in step S212), the device 100 establishes the adjacent node session 12 between the device itself and the determined transmission destination device (step S214). In addition, if the adjacent node session 12 has already been established between the device itself and the determined transmission destination device (YES in step S212), the processing of step S214 is skipped.

Then, the device 100 (encryption/decryption engine 1114) generates the encrypted packet 24 by encrypting the encrypted packet 22 with the encryption key associated with the adjacent node session 12 established between the device itself and the determined transmission destination device (step S216). Finally, the device 100 (session management engine 1112) transmits the generated encrypted packet 24 to the determined transmission destination device (step S218).

Thus, if the decrypted encrypted packet 22 is not addressed to the device itself (NO in step S204), the device 100 determines still another device to be a transmission destination of the encrypted packet 22, generates the encrypted packet 24 with the encryption key associated with the determined device, and transmits the generated encrypted packet 24. As described above, the process when the encrypted packet 24 is received from another device ends.

On the other hand, if the decrypted encrypted packet 22 is addressed to the device itself (YES in step S204), the device 100 (encryption/decryption engine 1124) decrypts the encrypted packet 22 into the transmission packet 20 with the encryption key associated with the end-to-end session 14 established between the device itself and the transmission source device (step S206). Then, the device 100 outputs the decrypted transmission packet 20 to the various applications 300 as a reception packet (step S208). As described above, the process when the encrypted packet 24 is received from another device ends.

As described above, in the network system 1 according to the present embodiment, when transmitting a packet from the transmission source device to the destination device, the encrypted packet 22 is generated by using the encryption key associated with the end-to-end session 14 between the transmission source device and the destination device. The encrypted packet 22 may be sequentially transmitted by one or more devices. However, even in such a process, since the encrypted packet 22 is sequentially transmitted in the encrypted state, the confidentiality of the packet can be maintained until the packet reaches the destination device.

In addition, in the network system 1 according to the present embodiment, even between devices between which the encrypted packet 22 is sequentially transmitted, the encrypted packet 22 is further encrypted by using the encryption key associated with the adjacent node session 12 between the devices. Therefore, even in the data communication process in which the encrypted packet 22 is sequentially transmitted, the confidentiality can be further improved.

<E. Advantages>

According to the network system 1 according to the present embodiment, it is possible to provide a solution through which each device 100 can independently realize data communication in a network in which a large number of devices are present.

It should be considered that the embodiment disclosed is an example in all points and not restrictive. The scope of the present invention is defined by the claims rather than the above description, and is intended to include all modifications within the scope and meaning equivalent to the claims.

EXPLANATIONS OF LETTERS OR NUMERALS

1 NETWORK SYSTEM
2 NETWORK
4 ACCESS POINT
6 MOBILE BASE STATION
12 ADJACENT NODE SESSION
14 END-TO-END SESSION
20 TRANSMISSION PACKET
20D, 22D, 24D, 26D DATA BODY PORTION
20H, 22H, 24H, 26H HEADER PORTION
22, 24, 26 ENCRYPTED PACKET
100 DEVICE
102 PROCESSOR
104 MAIN MEMORY
106 STORAGE
108 ROM
110 CONTROL UNIT
120 NETWORK INTERFACE
130 DISPLAY UNIT
140 INPUT UNIT
150 MEDIA INTERFACE
152 MEDIA
160 OS
170 COMMUNICATION PROCESSING PROGRAM
172 PRIVATE KEY
174 PUBLIC KEY
176 DIGITAL CERTIFICATE
178 HASH VALUE
180 HASH FUNCTION
190 IP ADDRESS
194 CONNECTION TABLE
200 CERTIFICATE AUTHORITY
300 VARIOUS APPLICATIONS
1110 TRANSMISSION ENGINE
1112, 1122 SESSION MANAGEMENT ENGINE
1114, 1124 ENCRYPTION/DECRYPTION ENGINE
1116 ADJACENT NODE SESSION MANAGEMENT TABLE
1120 ROUTER ENGINE
1126 END-TO-END SESSION MANAGEMENT TABLE
1128 SEARCH ENGINE
1210 INTERFACE
1216 OTHER PROTOCOLS

The invention claimed is:

1. A data transmission method in a network to which a plurality of devices are connected, the method comprising:
   a step in which a first device generates a first encrypted packet by encrypting a packet addressed to a second device with a first encryption key associated with the second device;
   a step of determining a device to be a transmission destination of the first encrypted packet, generating a second encrypted packet by encrypting the first encrypted packet with a second encryption key associated with the determined device, and transmitting the second encrypted packet to the determined device;
   a step in which a device that receives the second encrypted packet decrypts the second encrypted packet into the first encrypted packet and determines whether or not the decrypted first encrypted packet is addressed to the device;
   a step of determining another device and executing a transmission step if the decrypted first encrypted packet is not addressed to the device in the determination regarding whether or not the decrypted first encrypted packet is addressed to the device and of further decrypting the first encrypted packet if the decrypted first encrypted packet is addressed to the device;
   a step in which each of the plurality of devices transmits a public key of each device associated with the public key to another device; and
   a step in which the device that receives the public key determines an IP address of a transmission source device of the public key based on a hash value calculated from the public key according to a hash function.

2. A communication processing method in a device connected to a network, the method comprising:
   as steps executed when a packet addressed to another device is given, a step of generating a first encrypted packet by encrypting the packet with a first encryption key associated with the another device;
   a step of determining a device to be a transmission destination of the first encrypted packet, wherein the device to be a transmission destination is determined based on an IP address of each device;
   a step of generating a second encrypted packet by encrypting the first encrypted packet with a second encryption key associated with the determined device; and a step of transmitting the second encrypted packet to the determined device; and as steps executed when the second encrypted packet is received from another device, a step of decrypting the second encrypted packet into the first encrypted packet;

a step of determining whether or not the decrypted first encrypted packet is addressed to the device;

a step of determining still another device to be a transmission destination of the first encrypted packet, generating a second encrypted packet with a second encryption key associated with the determined device, and transmitting the generated second encrypted packet if the decrypted first encrypted packet is not addressed to the device in the determination regarding whether or not the decrypted first encrypted packet is addressed to the device;

a step of further decrypting the first encrypted packet if the decrypted first encrypted packet is addressed to the device;

a step of acquiring a private key and a public key;

a step of determining an IP address of the device based on a hash value calculated from the public key according to a hash function; and a step of transmitting the public key to another device.

3. The communication processing method according to claim 2, further comprising:

a step in which, when the public key and a digital certificate associated with the public key are received from the another device, validity of the digital certificate is determined; and a step in which, when a determination is made that the digital certificate is valid, an IP address of the another device is determined based on a hash value calculated from the public key according to a hash function.

4. The communication processing method according to claim 2, further comprising:

as a step executed when a packet addressed to the another device is given, a step of searching for an IP address of the destination device.

5. The communication processing method according to claim 2, further comprising:

as a step executed when a packet addressed to the another device is given, a step of establishing a session between the device and the another device and determining the first encryption key; and as a step executed when the second encrypted packet is received from the another device, a step of establishing a session between the device it-self and still another device to be a transmission destination of the first encrypted packet and determining the second encryption key.

6. A device, comprising:

a network interface for connecting to a network; and a control unit connected to the network interface, wherein the control unit includes:

a first encryption/decryption unit capable of executing a process for encrypting a packet into a first encrypted packet using a first encryption key associated with another device and a process for decrypting the first encrypted packet;

a second encryption/decryption unit capable of executing a process for encrypting the first encrypted packet into a second encrypted packet using a second encryption key associated with a device to be a transmission destination of the first encrypted packet and a process for decrypting the second encrypted packet, wherein the device to be a transmission destination is determined based on an IP address of the device;

a transmission management unit that transmits the second encrypted packet, which is generated by encrypting a packet addressed to another device in the first encryption/decryption unit and the second encryption/decryption unit, to a device as a transmission destination, and the transmission management unit determines whether or not a first encrypted packet generated by decrypting a second encrypted packet received from another device in the second encryption/decryption unit is addressed to the device, transmits a second encrypted packet generated by encrypting the first encrypted packet in the second encryption/decryption unit to still another device if the generated first encrypted packet is not addressed to the device, and further decrypts the first encrypted packet in the first encryption/decryption unit and outputs the decrypted first encrypted packet if the generated first encrypted packet is addressed to the device;

wherein the transmission management unit is operable to:
acquire a private key and a public key,
determine an IP address of the device based on a hash value calculated from the public key according to a hash function, and
transmit the public key to another device.

7. The device according to claim 6, wherein the transmission management unit is operable to:
when the public key and a digital certificate associated with the public key are received from the another device, determine validity of the digital certificate, and
when a determination is made that the digital certificate is valid, determine an IP address of the another device based on a hash value calculated from the public key according to a hash function.

8. The device according to claim 6, wherein the transmission management unit is operable to:
when a packet addressed to the another device is given, search for an IP address of the destination device.

9. The device according to claim 6, wherein the transmission management unit is operable to:
when a packet addressed to the another device is given, establish a session between the device and the another device and determine the first encryption key, and
when the second encrypted packet is received from the another device, establish a session between the device and still another device to be a transmission destination of the first encrypted packet and determine the second encryption key.

* * * * *